(12) United States Patent  
Morita

(10) Patent No.: US 7,265,899 B2
(45) Date of Patent: Sep. 4, 2007

(54) STEREOSCOPIC MICROSCOPE

(75) Inventor: Kazuo Morita, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/663,819

(22) Filed: Sep. 17, 2003

(65) Prior Publication Data
US 2004/0061936 A1 Apr. 1, 2004

(30) Foreign Application Priority Data
Sep. 18, 2002 (JP) .............................. 2002-271963

(51) Int. Cl.
*G02B 21/00* (2006.01)
(52) U.S. Cl. ...................... 359/384; 359/379; 359/380; 359/376
(58) Field of Classification Search ................ 359/384, 359/462, 368, 372, 373, 374, 375, 376, 377, 359/378, 380, 466, 473, 476, 477
See application file for complete search history.

(56) References Cited

U.S. PATENT DOCUMENTS

| | | | | |
|---|---|---|---|---|
| 4,412,727 A | * | 11/1983 | Taira | 359/375 |
| 4,605,287 A | * | 8/1986 | Lang et al. | 359/374 |
| 4,798,451 A | * | 1/1989 | Fujiwara | 359/375 |
| 5,668,661 A | * | 9/1997 | Tomioka | 359/380 |
| 6,333,813 B1 | * | 12/2001 | Morita et al. | 359/368 |
| 6,473,229 B2 | * | 10/2002 | Nakamura | 359/377 |
| 7,085,045 B2 | * | 8/2006 | Hanzawa et al. | 359/376 |

FOREIGN PATENT DOCUMENTS

| | | | |
|---|---|---|---|
| JP | S47-41473 | | 10/1972 |
| JP | S55-39364 | | 9/1980 |
| JP | 60263918 A | * | 12/1985 |
| JP | H6 -109977 | | 4/1994 |
| JP | H10-5244 | | 1/1998 |

* cited by examiner

*Primary Examiner*—Arnel Lavarias
(74) *Attorney, Agent, or Firm*—Arnold International; Bruce Y. Arnold

(57) ABSTRACT

An observation device including an intermediate tube that houses two relay optical systems and an image rotator, each relay optical system having an exit axis that is substantially parallel to the exit axis of the other relay optical system, and an ocular tube that houses two image formation optical systems and two eyepiece optical systems. The intermediate optical tube has a connecting portion that connects to a connector at the top of a stereoscopic microscope body at one end and is rotatably connected to the ocular tube at the other end, the ocular tube is extendable from, and collapsible into, the intermediate tube over a movement range in the direction of the exit optical axes of the pair of relay optical systems, and exit pupils of the pair of relay optical systems are arranged near a middle position of the range of movement of the ocular tube.

11 Claims, 25 Drawing Sheets

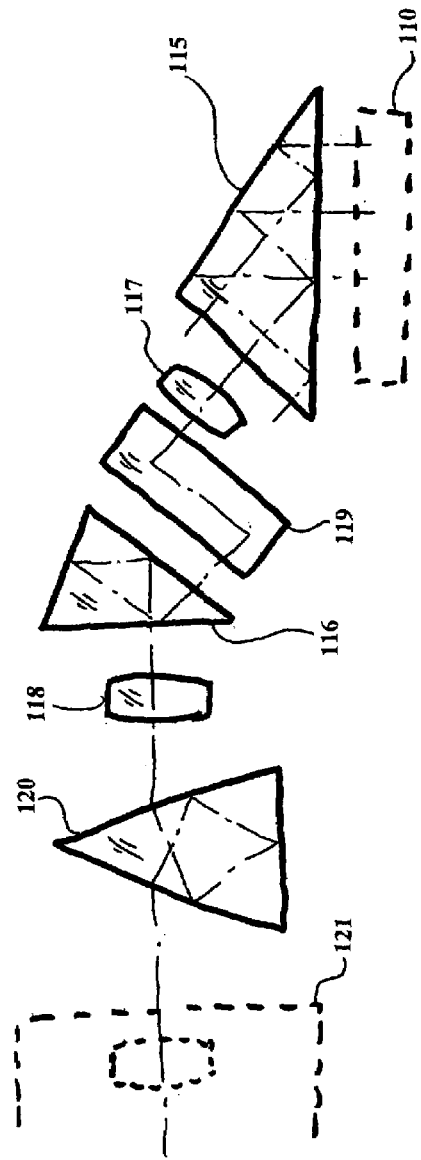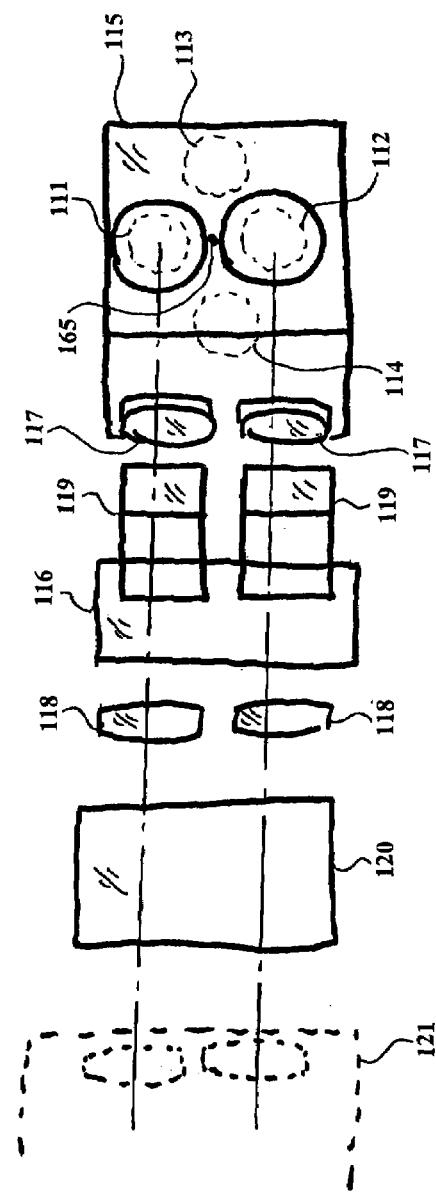
Fig. 9(a)
Fig. 9(b)

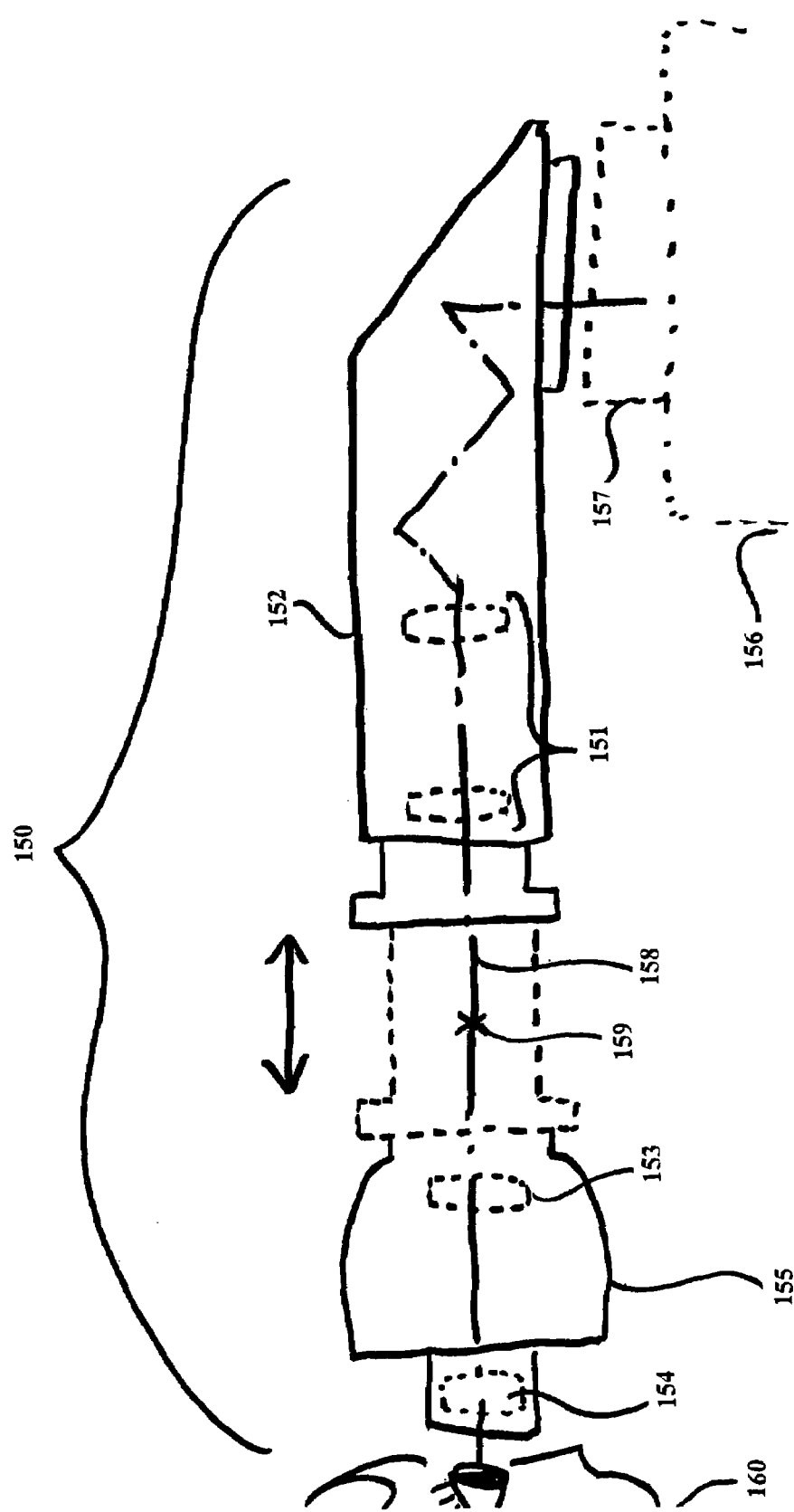

STEREOSCOPIC MICROSCOPE

This application claims the benefit of priority of JP 2002-271963, filed Sep. 18, 2002, the subject matter of which is hereby incorporated by reference.

BACKGROUND OF THE INVENTION

Stereoscopic microscopes of the prior art provide surgeons with a magnified view of a surgical area and have improved the efficacy of surgery. Such microscopes are used in surgical operations by neurosurgeons, otolaryngologists, as well as ophthalmologists. Today, so called micro surgery, which uses a microscope for surgery, is advanced and precise. The surgical microscope is designed so that it may provide images of the surgical area from various directions, and surgery is performed under the observation of two persons, an observer who has primary responsibility for the surgery (hereinafter referred to as the first observer) and an observer (hereinafter referred to as the second observer) who has the responsibility of supporting the first observer in order to improve the safety of the operation.

Many surgical microscopes of the prior art are limited in that the azimuthal directions that the first and the second observer peer into the surgical microscope must differ by 90 degrees or 180 degrees. This sometimes is inconvenient in that, at times, only one observer is able to actually observe the operation site, depending on the direction of the optical axis of the objective lens of the surgical microscope relative to the surgical area. FIG. 17(a) shows an example of a first observer 1 and a second observer 2 that observe a surgical area 4 from azimuthal directions that differ by 180 degrees. The optical axis of the objective lens of the surgical microscope 3 in this case is vertical. FIG. 17(b), on the other hand, shows an example where, using a similar surgical microscope 5 as that in FIG. 17(a), the first observer 7 is able to observe the surgical area 6 with the optical axis of the objective lens tilted from the vertical position. However, in this instance, it is difficult for the second observer 8 to comfortably peer into the microscope eyepiece. This problem occurs, for example, in the microscope shown in FIG. 1 of Japanese Examined Patent Publication S47-41473 and in the microscope shown in FIGS. 2-4 of Japanese Examined Utility Model Publication S55-39364. For most prior art surgical microscopes, the difference in azimuthal angles α between a primary observer and a secondary observer who is positioned on either side of the primary observer, is 90 degrees, as indicated in FIG. 1 of the present application. On the other hand, for a secondary observer who faces the primary observer, the difference in azimuthal angles α is 180 degrees.

The value of α is variable for the microscope disclosed in FIG. 1 of Japanese Laid-Open Patent Application H10-5244. The surgical microscope disclosed therein is shown in FIG. 18 of the present application. Because an optical path splitting means 11 is provided between the objective optical system 9 and the first observation device 10 used by the first observer, the microscope's size must be increased and the distance between the bottom surface 12 of the surgical microscope and the eyepiece lens 13 is increased, thereby decreasing the distance from the bottom surface 12 of the surgical microscope to the surgical area 14 (hereinafter termed the 'working distance').

For the microscope shown in FIG. 18, the second observation device 15 that provides observation images to the second observer is arranged directly below the first observation device 10. This causes both the space 19 (illustrated in FIG. 19, wherein the microscope is labeled 16) that is located below the eye level 18 of the first observer 17, when the second observer is positioned opposite the first observer to be narrowed. Referring to FIG. 20, it also causes the space 21 to the right of the first observer 23 when the second observer is to the right of the first observer, to be narrowed. This causes a problem in that a treatment tool 24 (FIG. 20) held by the first observer 23 is more likely to come into contact with the second observation device 22 of the surgical microscope 20, thereby causing an inconvenience during surgery.

BRIEF SUMMARY OF THE INVENTION

The present invention relates to a stereoscopic microscope such as a surgical microscope that enables a plurality of observers to observe the same microscope observation image of an observation object at the same time. More specifically, the present invention provides an easy-to-use surgical microscope for use by two observers that has the ability to make the difference in azimuthal angles for two observers peering into a surgical microscope variable while not diminishing the working space beneath the second observation device.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 9(a) and 9(b) show the arrangement of components of the optical system of an intermediate optical tube of Embodiment 2, with FIG. 9(a) being a side view and FIG. 9(b) being a top view;

FIGS. 16(a) and 16(b) show the second observation device of Embodiment 4, with FIG. 16(a) being a top view and FIG. 16(b) being a side view;

DETAILED DESCRIPTION

The stereoscopic microscope of the present invention includes a first connector for connecting a first observation device for use by a first observer and a second connector for connecting a second observation device for use by a second observer to a body of a stereoscopic microscope. The stereoscopic microscope also includes the following components: an objective optical system, and a pair of zoom optical systems which enables at least a first observer and a second observer to simultaneously observe the same microscope observation image of an observed object. The second connector is arranged at the same height on the stereoscopic microscope body, or at a higher position, as that of the first connector, the second observation device is connected so as to be capable of revolving about a central rotation axis of the second connector, and the angle between the rotation axis and the optical axis of the objective optical system in the region that lies between the object and the microscope body is ±15° or less.

According to the invention, the difference in azimuth angles at which a first observer and a second observer peer into a stereoscopic microscope can be made to be variable. And, since the second observation device is not arranged lower than the first observation device, a problem of the working space beneath the second observation device being diminished for surgery, as in the prior art, does not occur.

Furthermore, it is preferred that the rotation axis of the second observation device and the axis of the objective optical system in a region between the observation object and the main body of the stereoscopic microscope be parallel.

The light flux of one of the two zoom optical systems is split by a pupil splitter into two beams, each having somewhat different parallax, and emitted as a pair of light fluxes to the second observation device. In addition, the light fluxes of both of the zoom optical systems are split off by a beam splitter and directed to the second observation device. The second observation device receives the light fluxes split off by the beam splitter when the second observation device is positioned generally opposite the position of the first observer and it rotates the orientation of the images so that the observer is presented with a view of the surgical area having a proper orientation for the second observer's azimuthal position about the surgical area.

Figure 1:
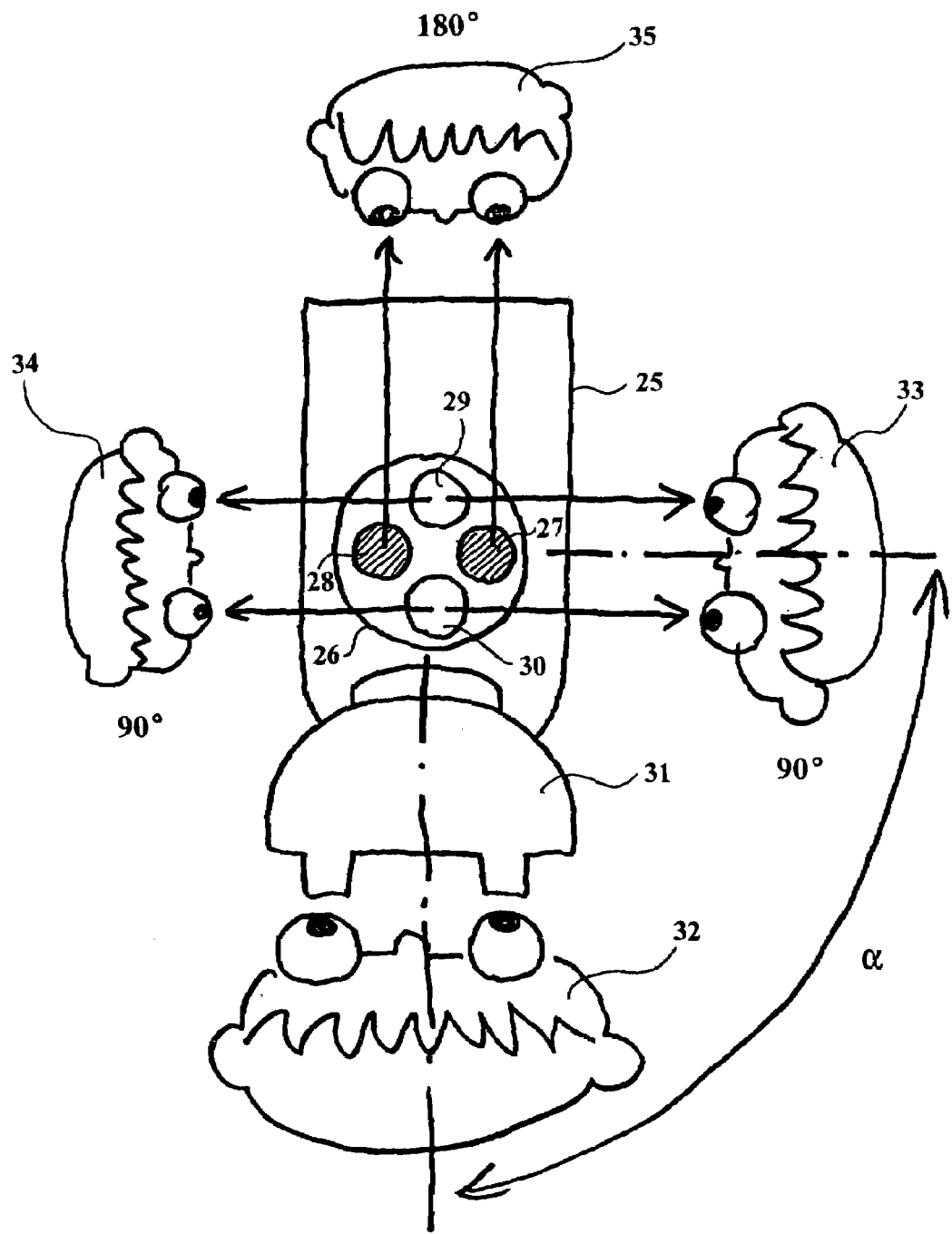
FIG. 1 is an explanatory diagram of a stereoscopic microscope of the present invention as viewed from above with a portion of a second observation device removed.

FIG. 1 is an explanatory diagram of a stereoscopic microscope according to this construction, viewed from above, with the second observation device removed from the second connector. The four light fluxes 27, 28, 29, and 30 that are conveyed within the second connector 26 are shown exiting the stereoscopic microscope main body 25. From among these four light fluxes, the two light fluxes 29 and 30 that do not have diagonal hatch lines are the light fluxes that provide the microscope image with a correct image orientation to a second observer 33 or 34 who peers into the microscope at angles of ±90° laterally in relation to the first observer 32 who observes through the first observation device 31. The two light fluxes 27 and 28 shown with diagonal hatch lines are the light fluxes that provide a correct image orientation of the microscope images to the second observer 35 who peers into the microscope at an azimuth angle opposite to that of the first observer 32. The term "correct image orientation" means that the orientation of the observation image of the surgical area as seen through the microscope by the second observer and the orientation of the surgical area as seen directly from the standing position of the second observer match.

Further, the second observation device is able to receive two light fluxes from among the four light fluxes illustrated, and to rotate these light fluxes as needed so as to provide a correct image orientation according to the standing position of the second observer. Thus, it is possible for the second observer, by rotating the second observation device, to always observe a correct image orientation even when observing from any of the three possible viewing positions (90° to the left, 90° to the right, or in a direction 180° relative to the direction of observation of the first observer).

Two light fluxes from among the four light fluxes at the second observation device are obtained by splitting a light flux from one of the zoom optical systems. To accomplish this, a pupil splitter is used which is positioned near an image of the exit pupil as relayed by a relay optical system. According to the present invention, the stereoscopic microscope main body provides four light fluxes that are directed to the second observation device while using only two zoom optical systems.

Figure 2:
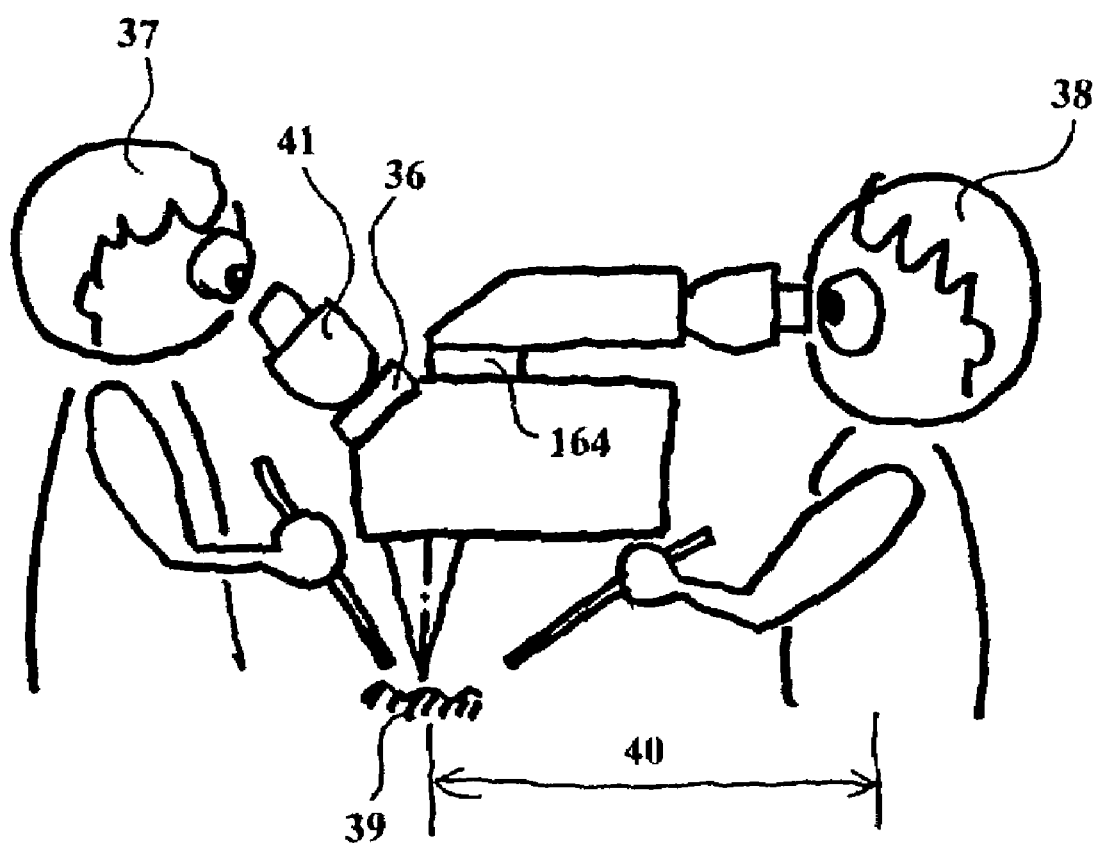
FIG. 2 is an explanatory diagram which illustrates considerations when designing a stereoscopic microscope according to the present invention.

According to one construction, a normal line to a contact plane that is formed as the top surface of the first connector is slanted toward the first observer, and the second connector is positioned on the microscope body in the opposite azimuthal direction. According to this construction, as shown in FIG. 2, because the first connector 36 has its surface normal slanted toward the first observer 37, the first observer is positioned near the first connector 36. This is advantageous in allowing the first observer to be closer to the surgical area by observing through a first observation device 41 that is slanted, rather than a first observation device that is horizontal, in that the first observer can be nearer the observation object 39. Furthermore, the second connector 164 is positioned nearby the first connector 36. This enables the distance 40 between the surgical area which is the observation object 39 and the second observer 38 to remain small. Further, the first connector 36 is positioned relatively closer to the optical axis of the objective lens than is the second connector 164. This is also advantageous in allowing the first observer to be closer to the surgical area by observing through a first observation device 41 and to treat the surgical area more easily.

Figure 3:
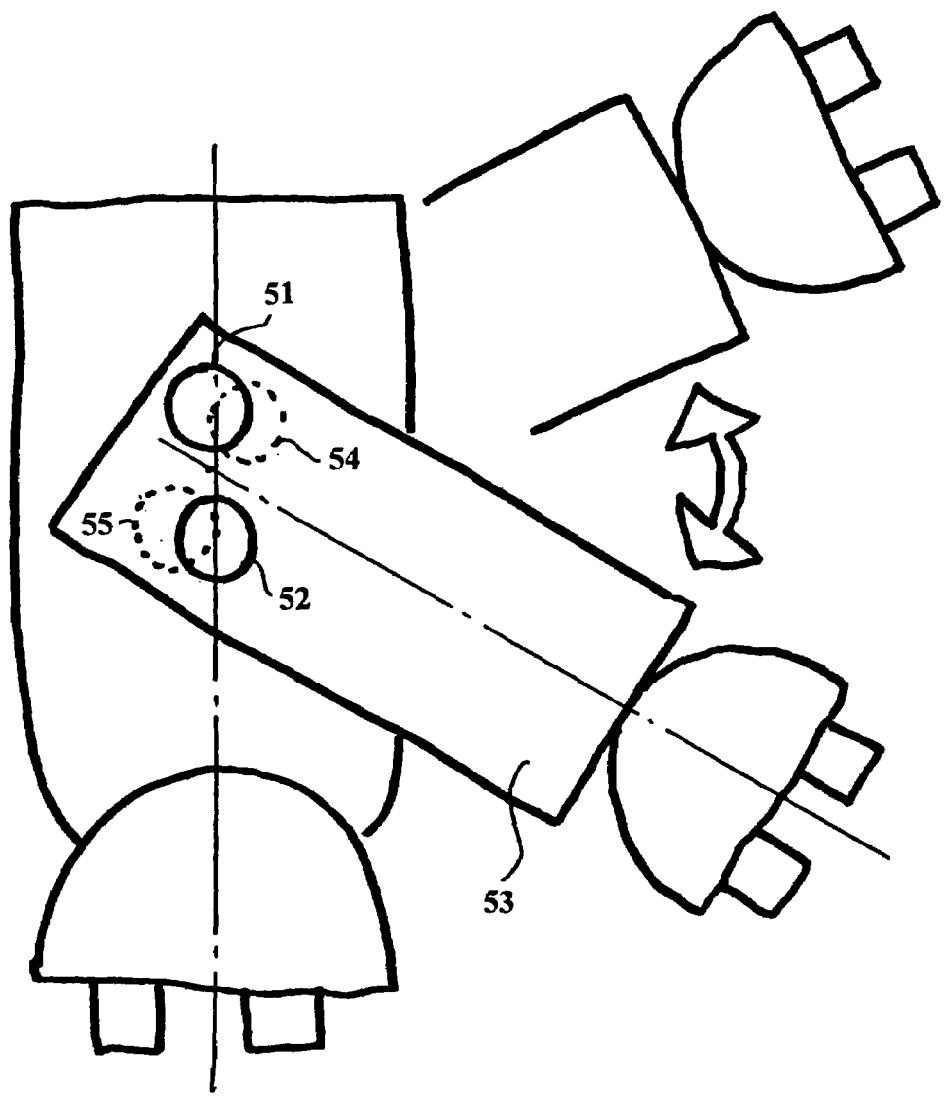
FIG. 3 illustrates some alternative positions in which the second observation device may be used to observe a surgical procedure.

The four light fluxes are emitted towards the second observation device 58 (FIG. 4) after being reflected an even number of times by a plurality of reflecting optical elements inside the microscope body 60. As shown in FIG. 3, the second observer by using the second observation device 53 can always view microscope images with a correct image orientation even if the second observation device is rotated somewhat from α=90 degrees to either side or if the second observation device is rotated to the position (α=180 degrees) facing the first observer. Some additional plus or minus rotation is permitted so long as parts of two light fluxes, such as 51 and 52 from among the four light fluxes, enter the two optical system openings 54 and 55 of the second observation device 53.

In addition to providing rotation at the rotation axis of the second connector, the second observation device may have a rotation component that is rotatable about a different axis. Where the angle made by the rotation axis of the rotation component and the axis of the objective optical system in a region between the observation object and the microscope body is within a range of 35° up to and including 55°, where all four light fluxes that enter into the second observation device reach the rotation component, and where the rotation component accepts only two of the light fluxes at a time from among the four light fluxes, the light fluxes that are accepted may be changed by rotating the rotation component. This construction enables the angle α, namely the difference in azimuth angle that the first observer and the second observer peer into a stereoscopic microscope, to be variable.

The second observation device may include an intermediate optical tube that houses a pair of relay optical systems and a single image rotator, and an eyepiece optical tube that houses a pair of image formation optical systems and a pair of eyepiece optical systems. The intermediate optical tube connects with the second connector at one end and with the eyepiece optical tube at the other end. Further, the eyepiece optical tube has the ability to extend and retract in the optical axis direction of the exiting light fluxes from the pair of relay optical systems housed by the intermediate optical tube, and both of the exit pupil positions of the pair of relay optical systems housed by the intermediate optical tube are arranged near an interim position within the range of the extending and contracting movement of the eyepiece optical tube. According to this construction, the second observer can move the position of the eyepiece optical tube within the range of the extending and contracting movement, thus enabling greater freedom of positioning of the second observer in the use of the microscope. Further, since the exit pupil positions of the pair of relay optical systems are arranged near to the middle position of the extending and contracting range, and since the pair of image formation optical systems housed by the eyepiece optical tube take in the light fluxes with very little eclipsing of these light fluxes, even if the second observer moves the eyepiece optical tube to another position within the range of movement, a microscope image with substantially no eclipsing can be observed.

Various embodiments for the stereoscopic microscope of the present invention will now be provided with reference to the drawings.

EMBODIMENT 1

Figure 4:
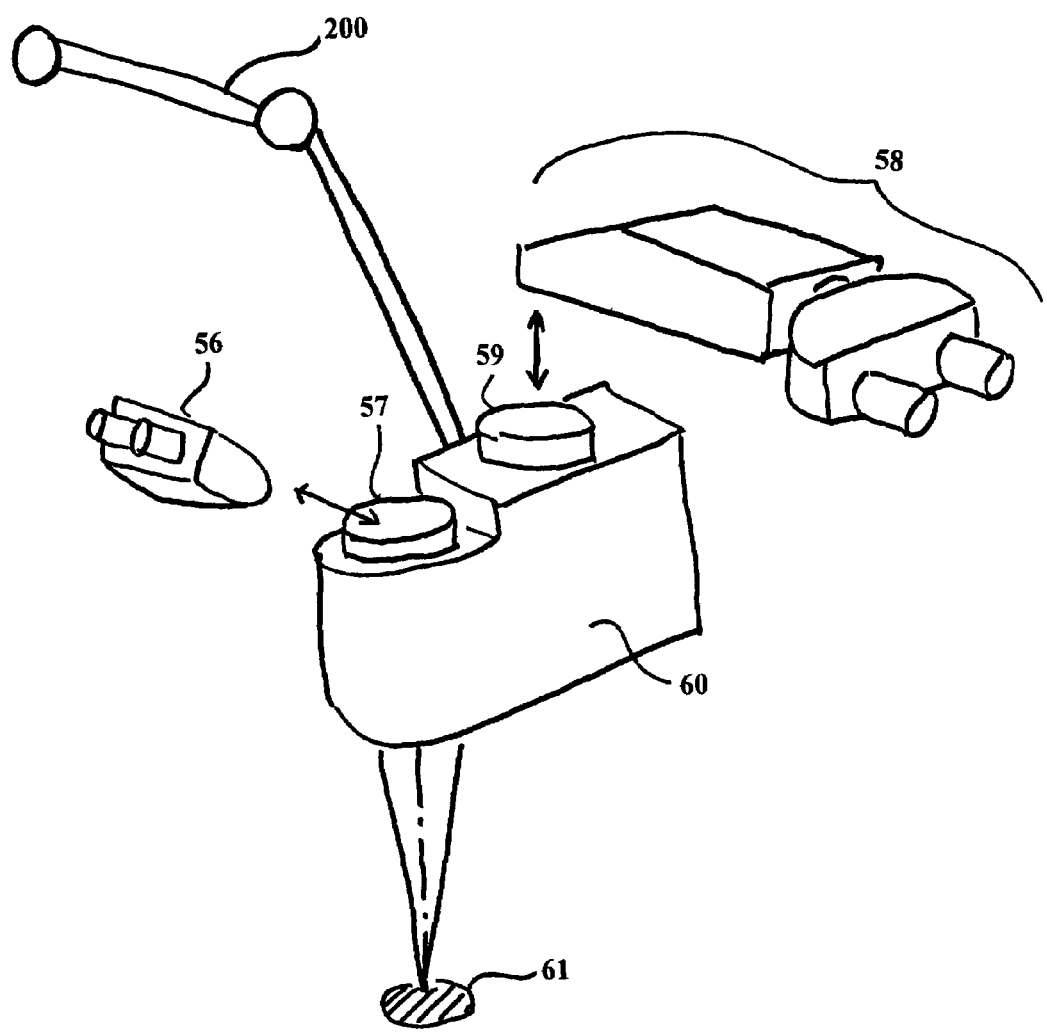
FIG. 4 is an exploded view of some of the components of Embodiment 1.
Figure 5:
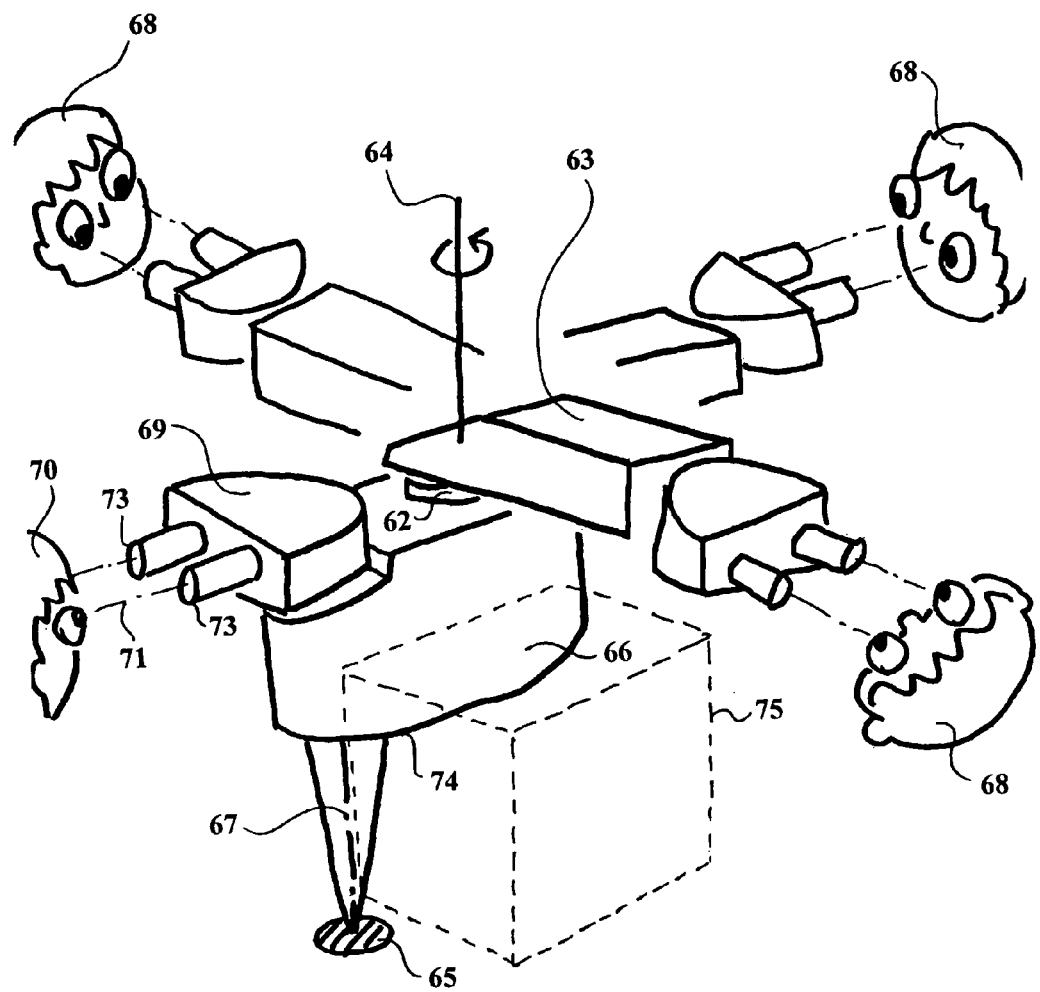
FIG. 5 shows Embodiment 1 of the invention fully assembled, with the second observation device rotated to three different azimuthal positions relative to the first observation device.

FIGS. 4 and 5 illustrate Embodiment 1, with FIG. 4 being an exploded view of some of the components and FIG. 5 showing the stereoscopic microscope of this embodiment fully assembled, with the second observation device rotated to three different azimuthal positions relative to the first observation device. As shown in FIG. 4, a first connector 57 connects the first observation device 56 to the stereoscopic microscope and a second connector 59 connects the second observation device 58 to the stereoscopic microscope. The second connector 59 is positioned on top of the stereoscopic microscope body 60. The stereoscopic microscope body 60 is supported by the support 200 and the second connector 59 is separated from the first connector 57. Rather than the second connector being positioned on the microscope body 60 lower than the first connector, the position of the second connector is higher and farther from the observation object 61 than is the position of the first connector 57.

Further, as shown in FIG. 5, the second observation device 63 is connected to the second connector 62 with the ability to rotate about a rotation axis 64. Furthermore, the rotation axis 64 of the second observation device 63 and the optical axis 67 of the objective optical system in the region from the observation object 65 to the microscope body 66 are constructed so as to be parallel. According to this construction, as seen in FIG. 5, the second observer 68 observing a microscope observation image by using the second observation device 63 has the ability to observe the microscope image from various angles in relation to the first observer 70 who observes the microscope observation image using the first observation device 69. Also, since the second observation device 63 is arranged on the microscope body at a position that is higher than that of the first observation device 69, the space from the eyepiece 73 of the first observation device to the bottom surface 74 of the microscope body 66 is not lengthened. By maintaining the space from the observation object 65 to the bottom surface 74 of the microscope body, there is no narrowing of the working distance directly below the stereoscopic microscope. In addition, the space 75 near the lateral vicinity of the microscope body 66 that is below the eye level 71 of the first observer and in front of the first observer 70 is not narrowed by the second observation device 63. The stereoscopic microscope of the this embodiment, as described above, enables work to be safely performed beneath the microscope by maintaining a sufficient space between the bottom of the microscope body and the surgical area. This embodiment also enables the difference in azimuth angles at which two observers may peer into a stereoscopic microscope to be varied.

EMBODIMENT 2

Figure 6:
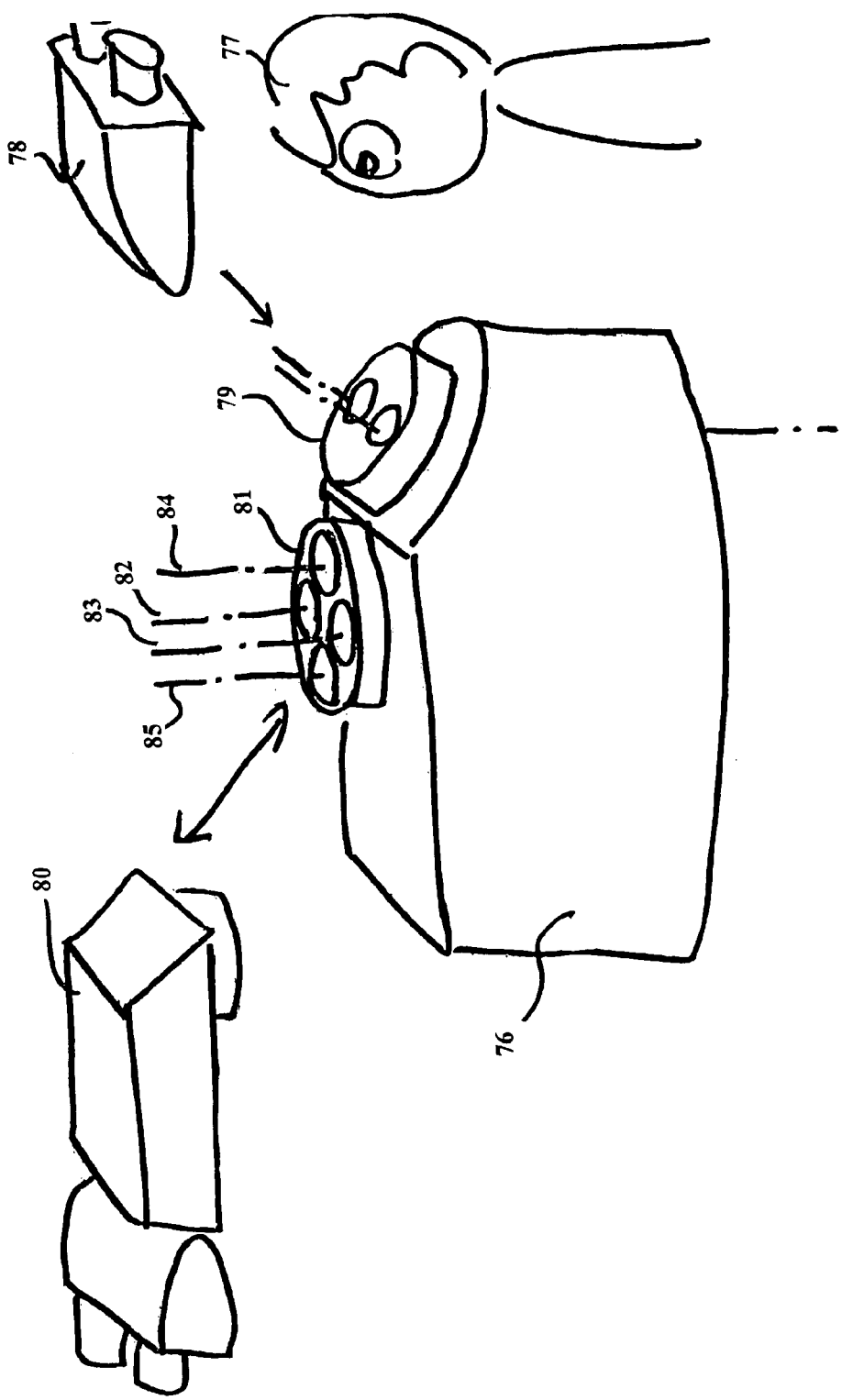
FIG. 6 is an exploded view of some of the components of Embodiment 2.

The construction of a stereoscopic microscope according to Embodiment 2 will be explained using FIG. 6. FIG. 6 is an exploded view of some of the components of Embodiment 2. A first connector 79 is provided for connecting the first observation device 78 for use by the first observer 77 and a second connector 81 is provided for connecting the second observation device 80 with the ability to rotate about an axis, thereby enabling the second observer to observe in different azimuthal directions (assuming the axis of rotation is vertical). Further, a normal line to a contact plane that is formed as the top surface of the first connector 79 is tilted toward the first observer 77, and the second connector 81 is positioned on the microscope body 76 in the opposite azimuthal direction and near to the position of the first connector. In addition, the light fluxes 82, 83, 84, and 85 exit from within the second connector 81, two of which may then selectively enter the second observation device 80, depending on the rotation angle of the second connector.

Figure 7:
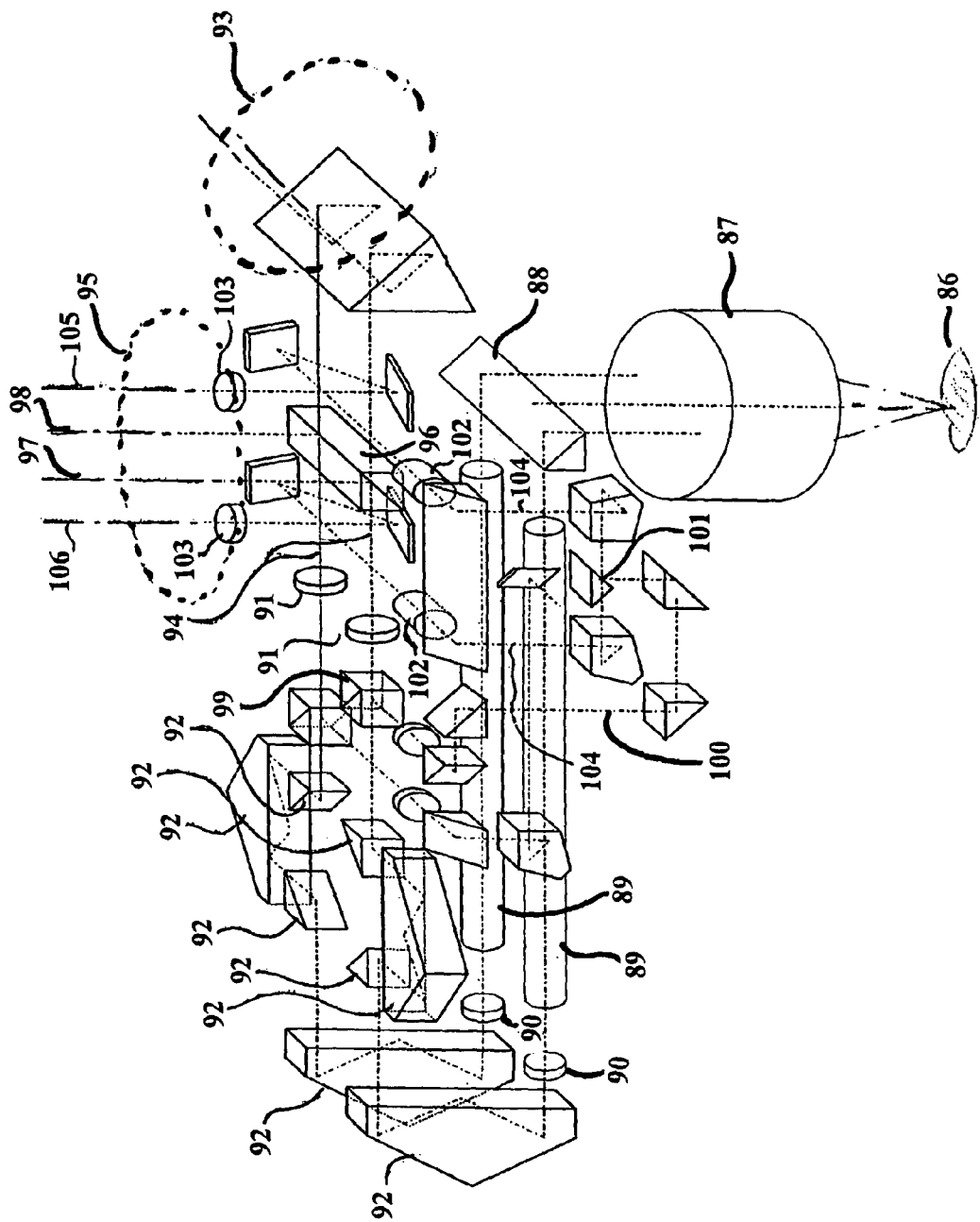
FIG. 7 shows the arrangement of components of the optical system of Embodiment 2.

FIG. 7 illustrates the optical arrangement inside the stereoscopic microscope main body shown in FIG. 6. Light flux emitted from the observation object 86 passes through the objective optical system 87 and is deflected by the optical path reflecting element 88. A first reflective surface (i.e., the reflective surface of optical path reflecting element 88) deflects light paths from the objective optical system to a substantially horizontal direction. This light flux is then separated into two light fluxes by passing through left and right zoom optical systems 89, 89 after which the light fluxes are each relayed by a respective front lens group 90 and passed into a pair of first relay optical systems. The first relay optical systems are formed of various prisms 92. A second reflective surface (i.e., the lower reflective surface of the prisms 92) then deflects the light paths upward, and a third reflective surface (i.e., the upper reflective surface of the prisms 92) then deflects the light paths to a substantially horizontal direction. Thus, the first through third reflective surfaces form a folded optical system and the pair of zoom optical systems is arranged within the folded optical system. After exiting the first relay optical systems, each left and right light flux passes through a respective rear lens group 91 and is then emitted from the first connector 93 toward the first observation device (not shown).

Further, the light fluxes 94, 94 exiting the first relay optical systems are split by a beam splitter 96 which is in the optical paths and directly below the second connector 95. Thus, two light fluxes 97 and 98 are split off from light fluxes that otherwise would enter the first connector 93 and instead are directed to the second connector 95. As illustrated in FIG. 7, the first and second connectors are arranged on opposite sides of the optical axis of the objective optical system as viewed in a direction of the horizontal optical path of the folded optical system.

In addition, a light flux that passes through one of the first relay optical systems has a portion split off by a beam splitter 99 that is arranged in the optical path of one of the first relay optical systems. The light flux 100 subsequent to being split off is guided to a pupil splitting prism 101 using a plurality of prisms. The pupil splitting prism 101, which forms the light fluxes 104 and 104 by splitting the light incident thereon, is arranged near to the position where the exit pupil of one of the zoom optical systems is relayed. Further, the light fluxes 104 and 104 are further relayed by a second relay optical system which is formed of a front lens group 102, a rear lens group 103, as well as various prisms and mirrors in each light path so as to become two fluxes 105 and 106 that exit from the second connector 95 toward the second observation device (not shown). Accordingly, a total of four light fluxes exit from the second connector 95.

The two light fluxes 105 and 106 from among these four light fluxes are the light fluxes that provide the microscope image in the correct image orientation to the second observer when the second observer is positioned to the left or right of the first observer (i.e., when α=90 degrees), and the remaining two light fluxes 97, 98 are the light fluxes that provide the microscope image in the correct image orientation to the second observer when the second observer is positioned facing the first observer (i.e., when α=180 degrees). In addition, all four light fluxes 97, 98, 105, and 106 exit from the second connector 95 after being reflected an even number of times by a plurality of prisms and mirrors within the stereoscopic microscope main body.

Figure 14:
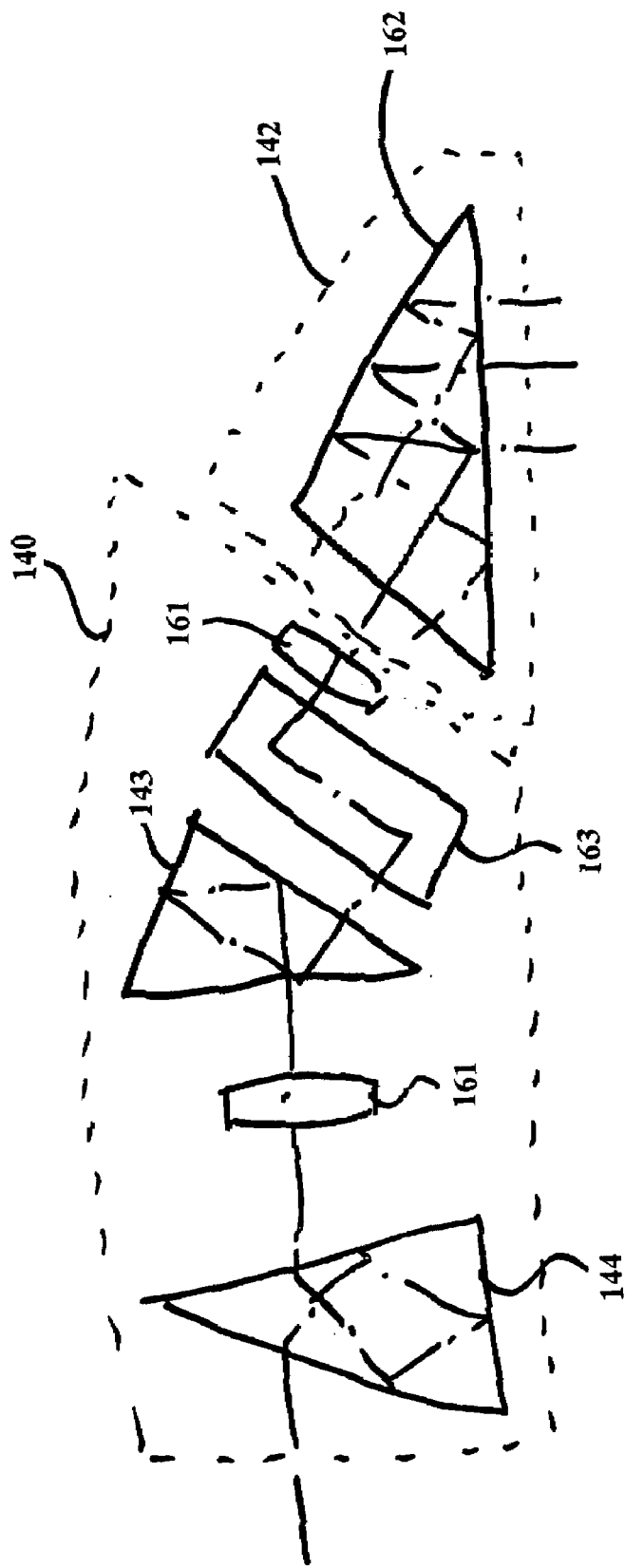
FIG. 14 shows the arrangement of the components of the optical system of the second observation device according to Embodiment 3.

As used in the claims, the term "first leading optical system" corresponds to, in FIG. 7, the optical system composed of the beam splitter 99 and all other optical elements arranged on the optical path branched by the beam splitter 99 and the beam splitter 96, the term "second leading optical system" corresponds to, in FIG. 7, the optical elements between the objective lens 87 and the second connector 95, and the term "third leading optical system" corresponds to, in FIG. 14, the prism 162.

According to the construction of the stereoscopic microscope main body described above, the space between the surgical area which is the observation object and the second observer can be maintained short when a first observer and a second observer use a stereoscopic microscope facing each other. Thus, access to the surgical area is improved for the second observer. Furthermore, since four light fluxes are provided and two of these are selected for observation by the rotational position of the second observation device, a compact arrangement is made possible for a stereoscopic microscope main body (i.e., only two, not four, zoom optical systems are required).

Figure 8:
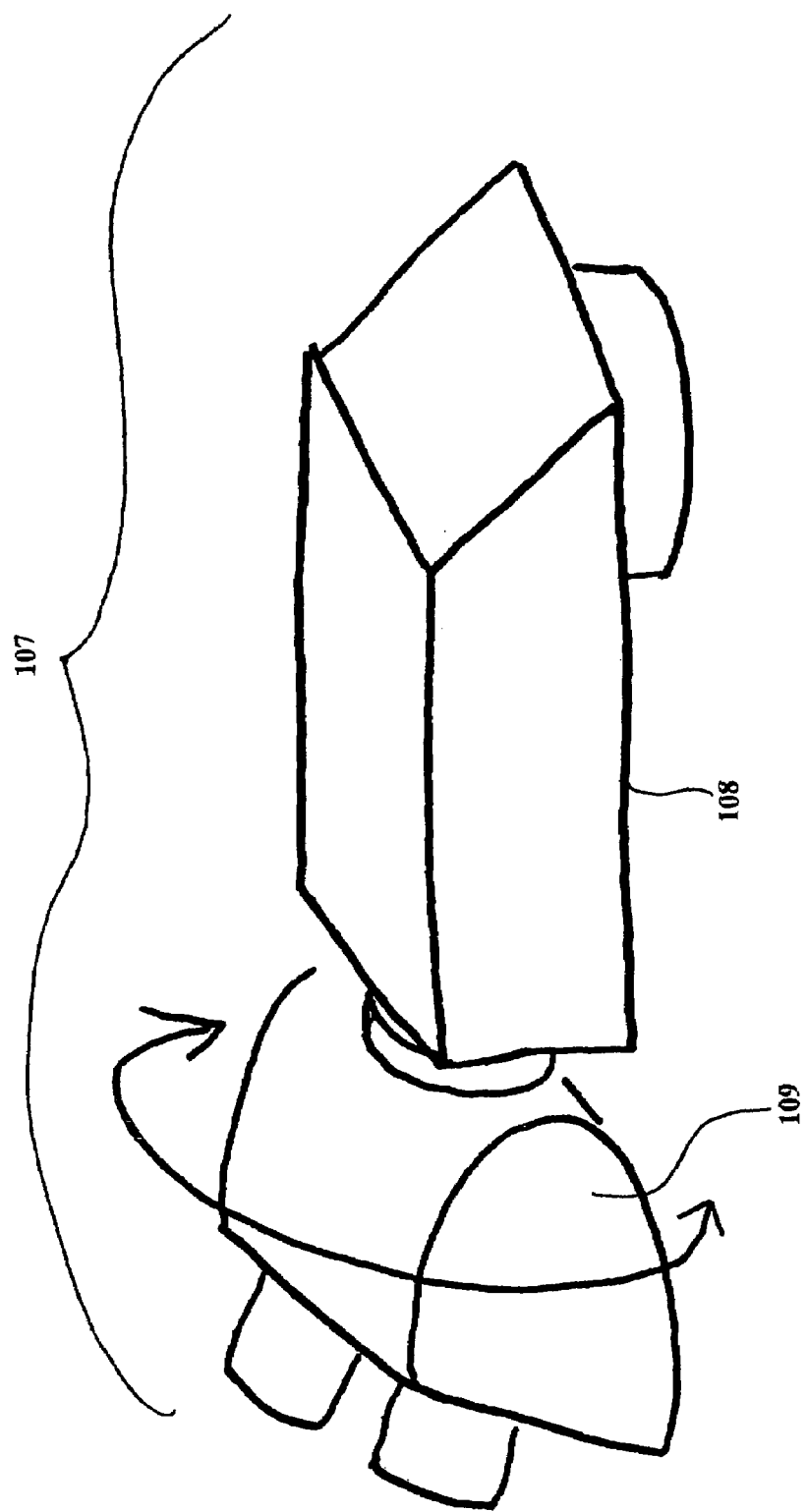
FIG. 8 shows the second observation device of Embodiment 2 of the present invention.

A description will now be given of the second observation device of this embodiment with reference to FIG. 8. The second observation device 107 is comprised of an intermediate optical tube 108 and an eyepiece optical tube 109, and the eyepiece optical tube connects to the intermediate optical tube in a manner that allows the eyepiece optical tube to rotate, as indicated by the double-headed arrow. This allows the second observer to tilt his head to the left or right while viewing into the eyepiece optical tube. Further, the intermediate optical tube 108 houses a single image rotator (not shown) and a pair of relay optical systems (not shown).

FIG. 9(a) is a side view of the optical components within the interior of the intermediate optical tube of this embodiment, and FIG. 9(b) shows a top view thereof. Only two light fluxes 111 and 112 from among the four light fluxes 111, 112, 113, and 114 exiting the second connector 110 of the microscope body enter the pair of relay optical systems composed of prisms 115 and 116, lenses 117 and 118, and the erection optical systems 119, 119. By rotating the second observation device roughly 90° about the rotation axis 165, the light fluxes 111 and 112 will be blocked from entering the second observation device and the light fluxes 113 and 114 will no longer be blocked and will enter the second observation device. In this manner, the intermediate optical tube of the second observation device accepts only two light fluxes at a time from among the four light fluxes that exit from the second connector, and the light fluxes that are accepted for viewing by the second observer can be switched by rotation of the second observation device about the rotation axis 165 (which corresponds to the rotation axis 64 shown in FIG. 5) to a different observation position.

In addition, the single image rotator 120 housed within the intermediate optical tube is arranged so as to transmit simultaneously both light fluxes from the pair of relay optical systems. The single image rotator is rotated at a ratio of ½ of the rotation amount of the eyepiece optical tube 121. By combining the construction of the second observation device given above and the construction of the microscope body described above, it becomes possible to always observe an image that has a proper image orientation. Furthermore, when the second observation device is rotated from these three positions within a range of angles where the pair of relay optical systems housed within the intermediate optical tube takes in the light fluxes, the second observer can observe images with the correct image orientation. Further, by the effect of the image rotator, it is possible for the second observer to view an observation image with substantially no eclipsing of the light flux even if the eyepiece optical tube is rotated, thereby increasing the freedom in the observation positions of the second observer. The term "ocular optical system" as used herein corresponds to the optical system composed of the optical elements 116 through 120 in FIG. 9(*a*) and includes the lens(es) in the eyepiece optical tube 121.

FIGS. 21-24 show an example of the construction of the image rotator and the mechanism that can be used in the microscope according to this invention for rotating the image rotator at a ratio of one-half the rotation amount of the eyepiece optical tube. The structure is similar to that disclosed in Japanese Laid-Open Patent Publication H6-109977.

Figure 21:
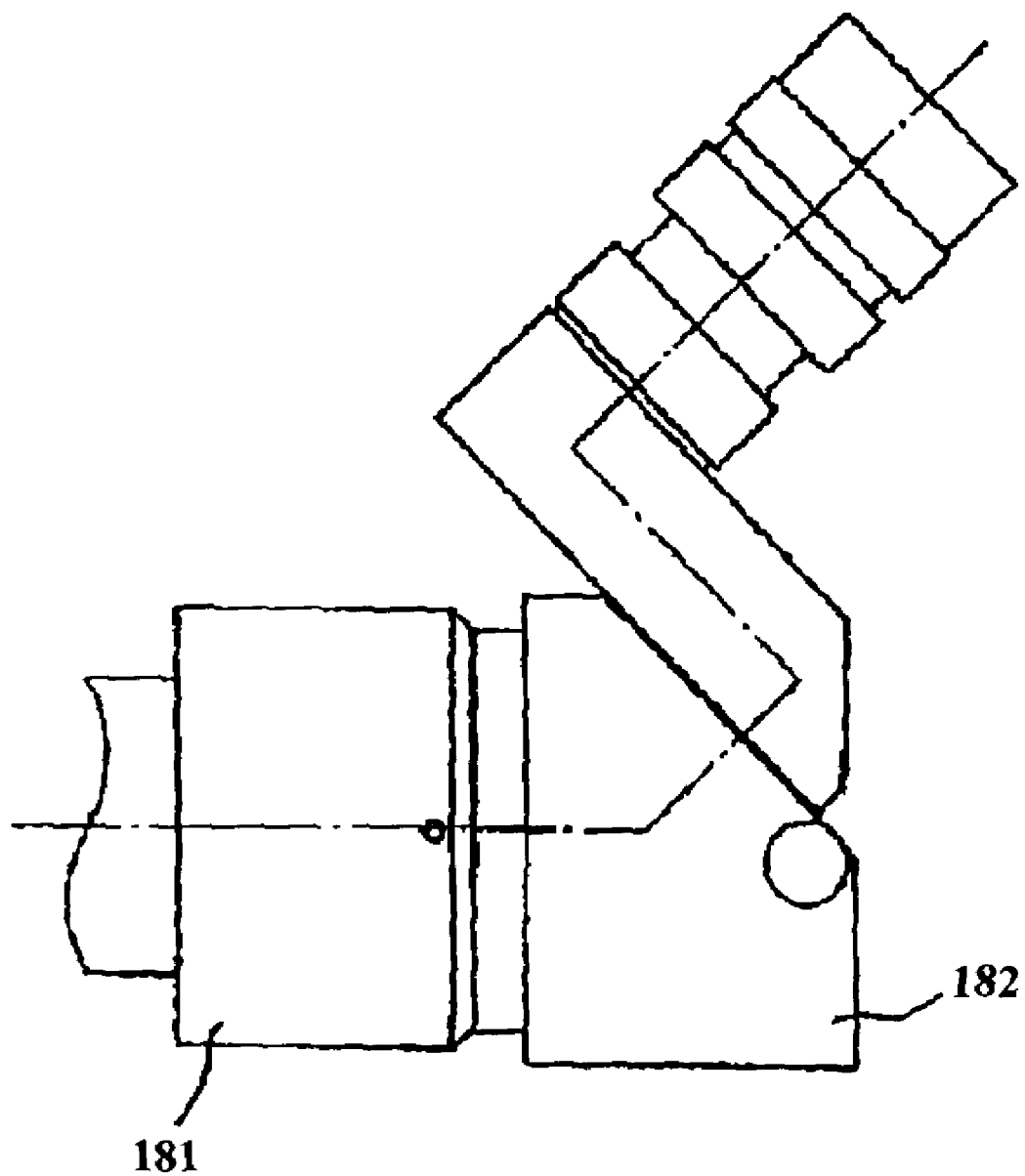
FIG. 21 is an external view of a housing containing an image rotator of the prior art.
Figure 22A:
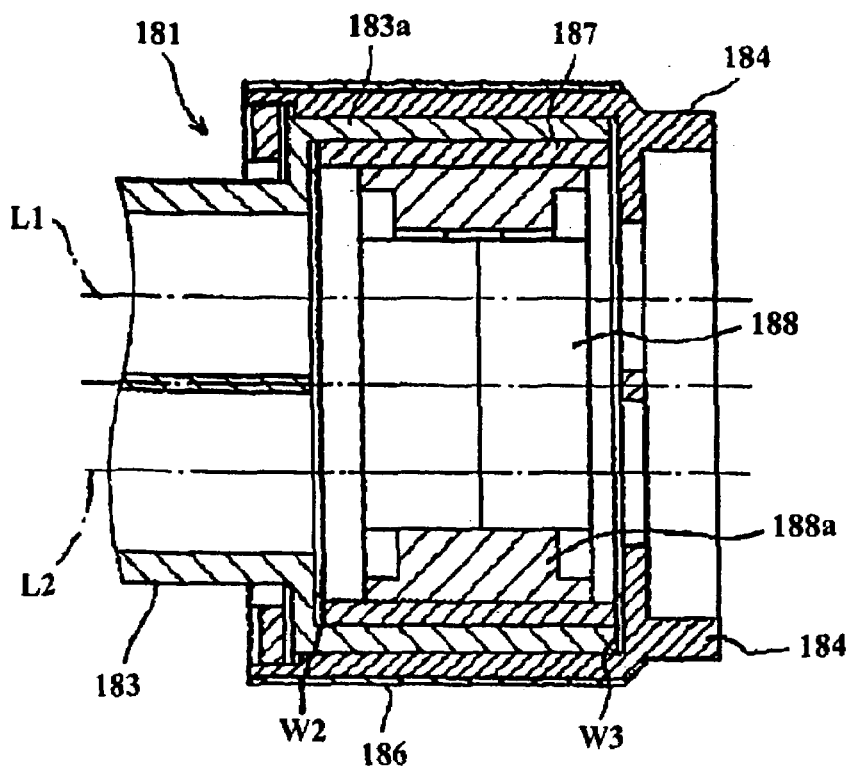
FIGS. 22(a) and 22(b) are horizontal and vertical cross-sectional views, respectively, showing the interior of the housing shown in FIG. 21.
Figure 22B:
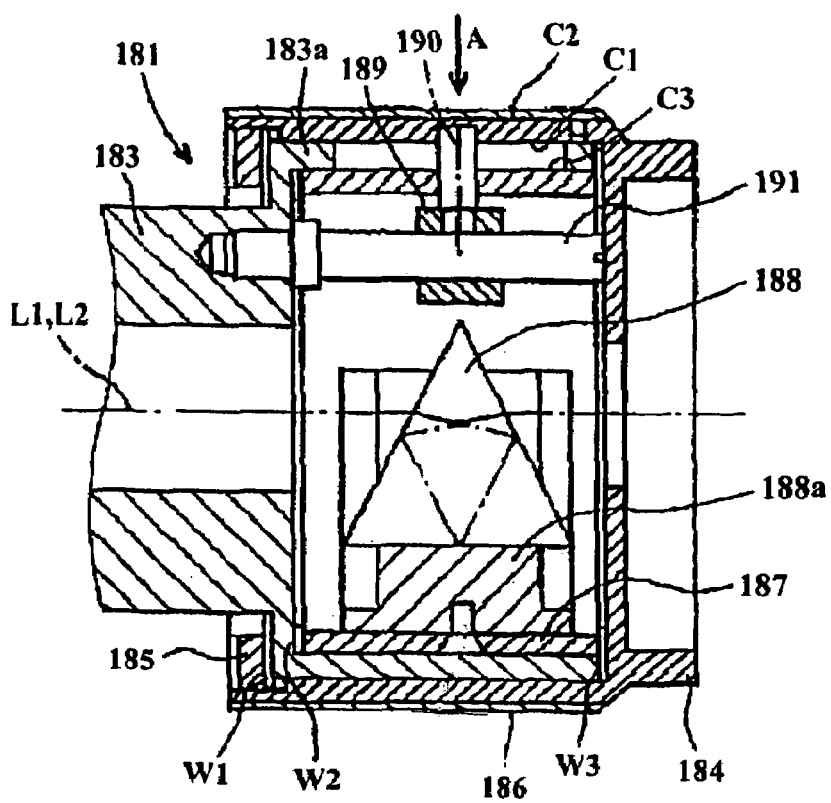

FIG. 21 is an example of a housing 181 containing an image rotator optical system with an eyepiece lens tube 182 having a binocular optical system attached. FIGS. 22(*a*) and 22(*b*) show horizontal and vertical cross-sectional views, respectively, of the interior of the housing 181. In the figures, a fixed tube 183 is provided having cylindrical steps and is designed so that two left and right observation optical axes L1 and L2 of light fluxes from an observation object (not shown) can pass through the interior of the fixed tube.

A linear cam groove C that is parallel to the observation optical axes L1 and L2 is formed on a large-diameter section 183*a* of the fixed tube 183. A first tube 184 that is fit outside the fixed tube 183 on the large-diameter section 183*a* is freely rotatable and includes a cam groove C2 which intertwines with the cam groove C1. The eyepiece lens tube 182 (FIG. 21) is attached by a retaining member (not shown) to the first tube 184 so that, when the eyepiece lens tube 182 is rotated, the first tube 184 rotates with it as a unit.

As labeled in FIG. 22(*b*), a stopper ring 185 is screwed into the first tube 184 and secured to the fixed tube 183 via a washer W1. A cover 186 is attached just outside the first tube 184. A second tube 187 that is equipped with an image rotator optical system, is fit so as to be freely rotatable inside the large-diameter section 183*a*, and a cam groove C3 which intertwines with the cam groove C1 is formed on the outer circumference of the second tube 187.

Figure 23:
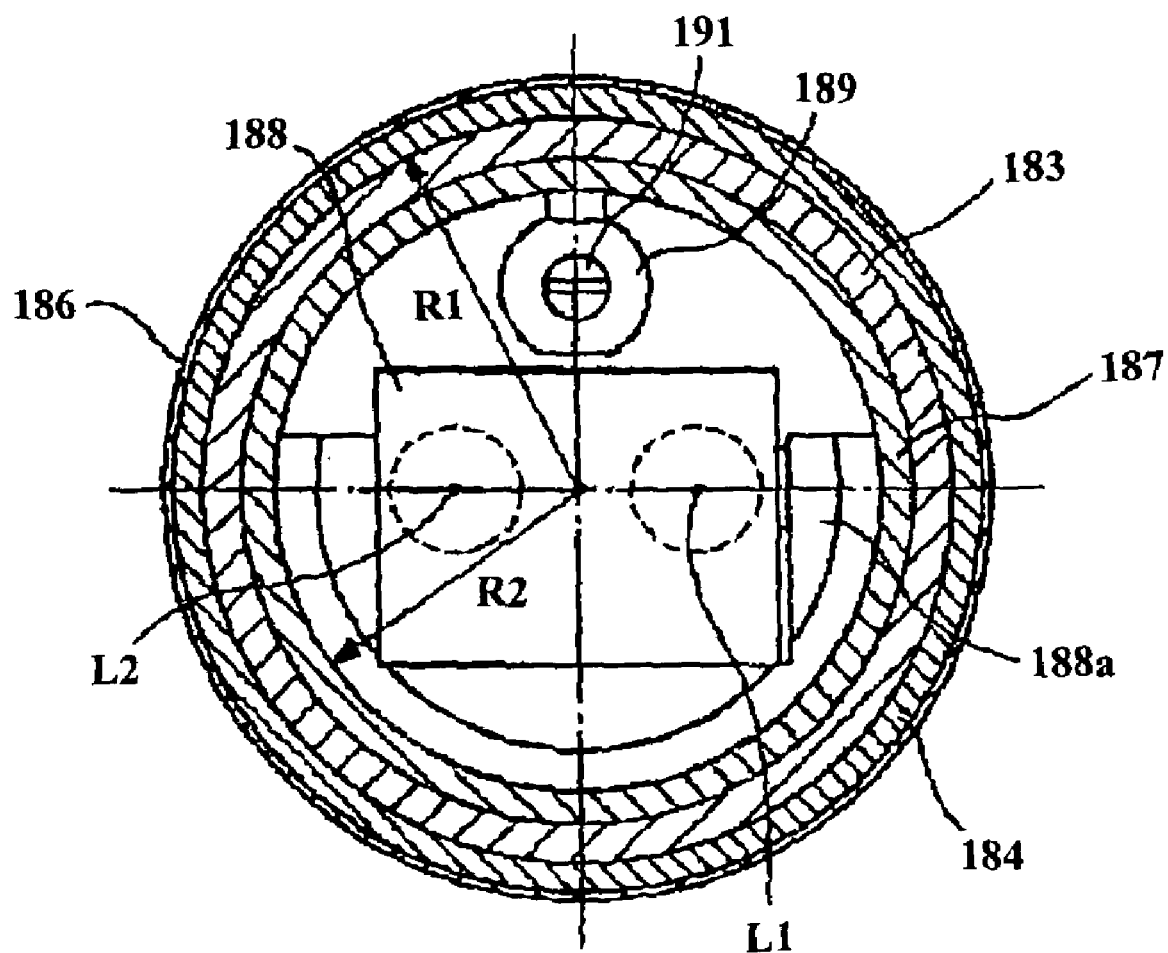
FIG. 23 is a cross-sectional view of the front interior of the housing shown in FIG. 21.

FIG. 23 is a cross-sectional view of the front interior of the housing 181. As shown in FIG. 23, the second tube 187 has a U-shaped, rotator holding unit 188*a* which holds an image rotator prism 188. The image rotator prism 188, which is fixed within the U-shaped, rotator holding unit 188*a* by a flat-head screw (guide bar) 191, receives and transmits the left and right light fluxes traveling along the observation optical axes L1 and L2.

A cam pin 190 (FIG. 22(*b*)) that is screwed into a moving ring 189 is simultaneously engaged by the cam grooves C1, C2 and C3. A guide bar 191 is screwed into the fixed tube 183 so that its axis is oriented parallel to the observation optical axes L1 and L2. The guide bar 191 guides the moving ring 189 which surrounds the guide bar. A washer W2 is placed in a thrust-direction space between the fixed tube 183 and the second tube 187, and a washer W3 is placed within a space of the first tube 184 that extends over both the second tube 187 and the fixed tube 183, with the effect of preventing the first and second tubes 184 and 187 from moving in the thrust direction.

Figure 24:
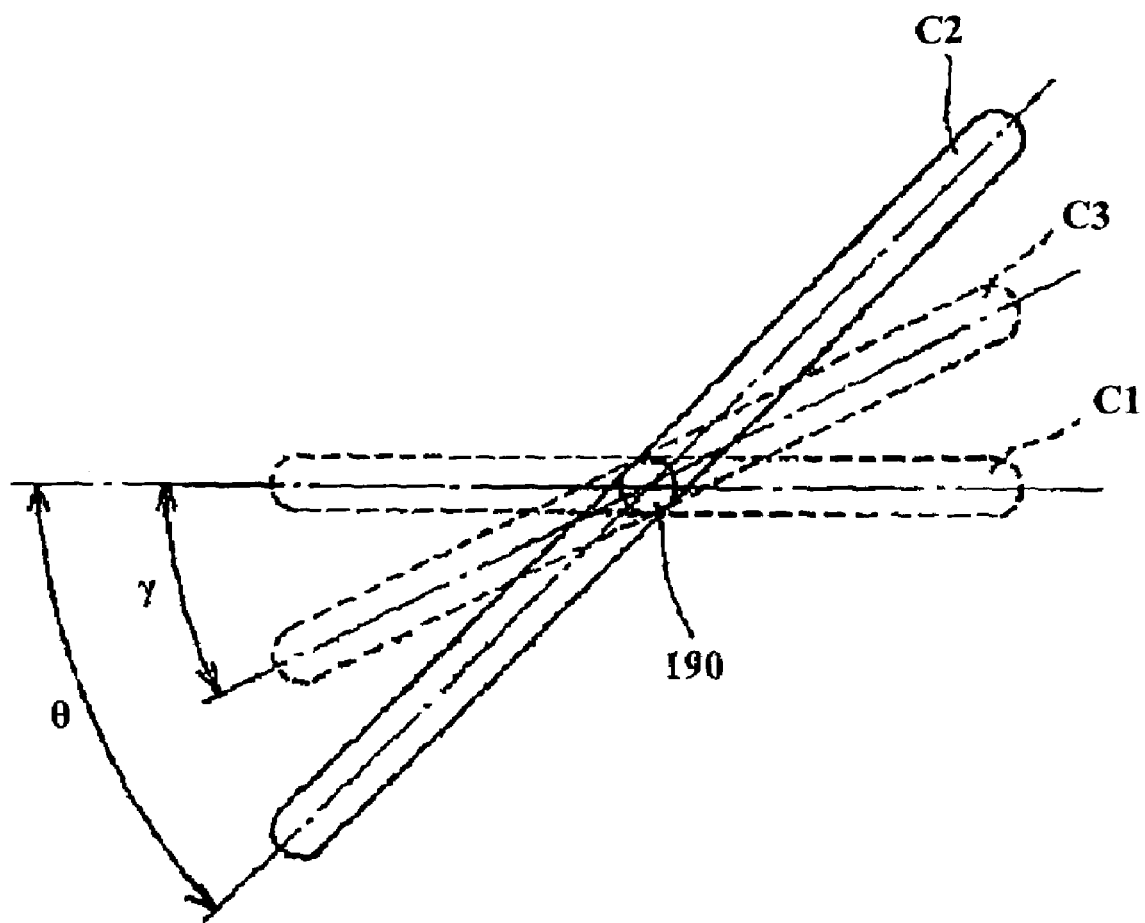
FIG. 24 is a view of the cylindrical cams of the image rotator as seen from the direction of arrow A in FIG. 22(b).

FIG. 24 is a view of cylindrical cams of the image rotator as seen from the direction of arrow A in FIG. 22(*b*). If the angles at which the cam grooves C2 and C3 intertwine with the linear cam groove C1 are denoted as θ and γ, respectively, and the radius of the first tube 184 and the second tube 187 shown in FIG. 23 are denoted as R1 and R2, respectively, the following relationship exists between θ and γ, namely, $$\tan \gamma = 2(R2/R1)\tan \theta.$$

First, when the eyepiece lens tube 182 is rotated, the first tube 184 also rotates together with the eyepiece lens tube 182 as one body. At this time, the cam pin 190 which engages with the cam groove C2 moves only parallel with the observation optical axes L1 and L2 as a result of being constrained by the cam groove C1 and the guide bar 191. By the movement of the cam pin 190, the second tube 187, which holds the image rotator prism 188 inside, rotates by half the rotation angle of the first tube 184 to which the eyepiece lens tube 182 is attached.

Figure 10:
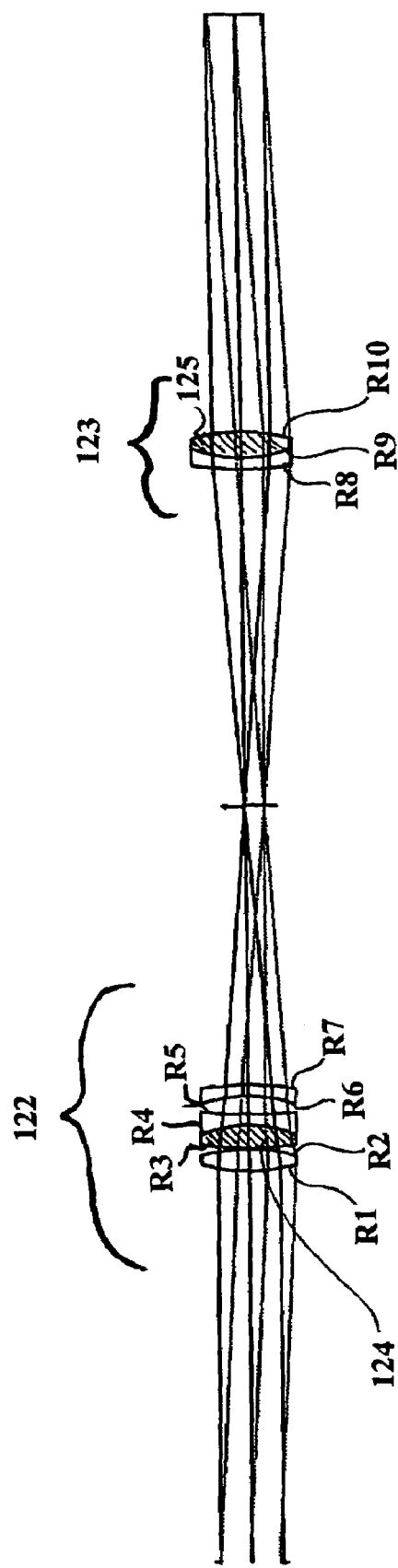
FIG. 10 shows the components of the second relay optical system of Embodiment 2.

Next, a detailed description will be given of different optical systems. FIG. 10 shows the components of the second relay optical system of Embodiment 2 that is formed of a front lens group 122 and a rear lens group 123. The lens elements 124 and 125, shown with cross-hatching, are formed of anomalous dispersion glass. Use of anomalous dispersion glass in these lens elements minimizes the deterioration of optical performance of the second relay optical systems.

Table 1 below lists the surface number #, the radius of curvature R of each surface, the on-axis spacing D between surfaces, as well as the index of refraction $N_d$ and the Abbe number $v_d$ (both at the d-line) of the lens components of the second relay optical systems.

TABLE 1

| # | R | D | $N_d$ | $v_d$ |
|---|---|---|---|---|
| Pupil Splitting Position | | 68.95 | | |
| 1 | 30.762 | 3.9 | 1.49 | 70.2 |
| 2 | −30.762 | 0.2 | | |
| 3 | 70.517 | 4.0 | 1.50 | 81.6 |
| 4 | −20.456 | 1.9 | 1.70 | 55.5 |
| 5 | 102.56 | 3.2 | | |
| 6 | −25.62 | 2.0 | 1.58 | 41.5 |
| 7 | −55.472 | 49.51 | | |
| Image Formation Plane | | 60.53 | | |
| 8 | 62.318 | 2.0 | 1.64 | 44.9 |
| 9 | 24.469 | 4.6 | 1.44 | 95.0 |
| 10 | −31.864 | 70 | | |
| Exit Pupil Plane | | | | |

Figure 11A:
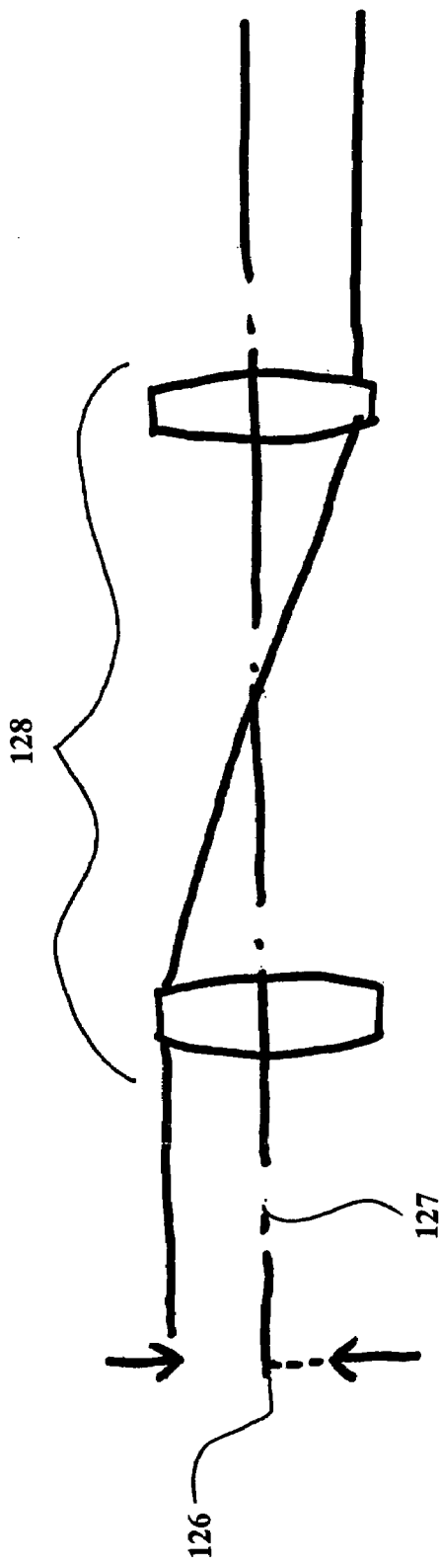
FIGS. 11(a) and 11(b) show alternative constructions of the second relay optical system for Embodiment 2.
Figure 11B:
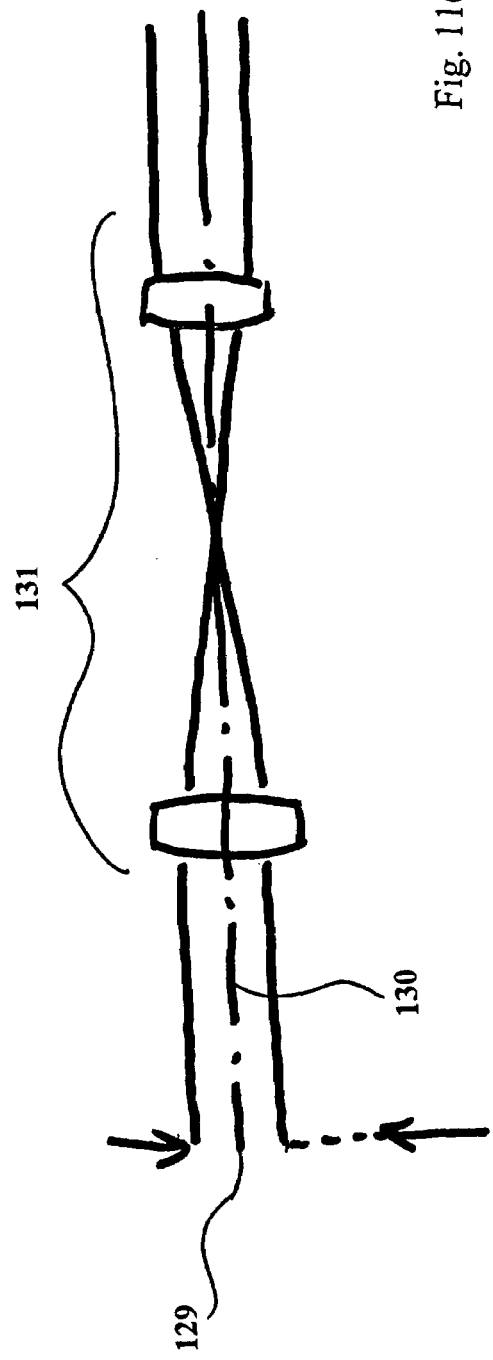

The optical axes of the second relay optical systems pass through the geometric centers of each of two parts of the exit pupil, which two parts are formed by dividing the pupil of the zoom optical system in half by the pupil splitting prism and relaying the divided pupils by the first relay optical system. For this reason, in comparison to the relay optical system 128 through which the optical axis 127 passes the center 126 of the exit pupil prior to splitting as shown in FIG. 11(*a*), the relay optical system 131 through which the optical axis 130 passes the geometric center 129 of the exit pupil subsequent to being split in half as shown in FIG. 11(*b*) can be made to have a smaller lens diameter, thereby resulting in the ability to make the stereoscopic microscope main body more compact.

Figure 12:
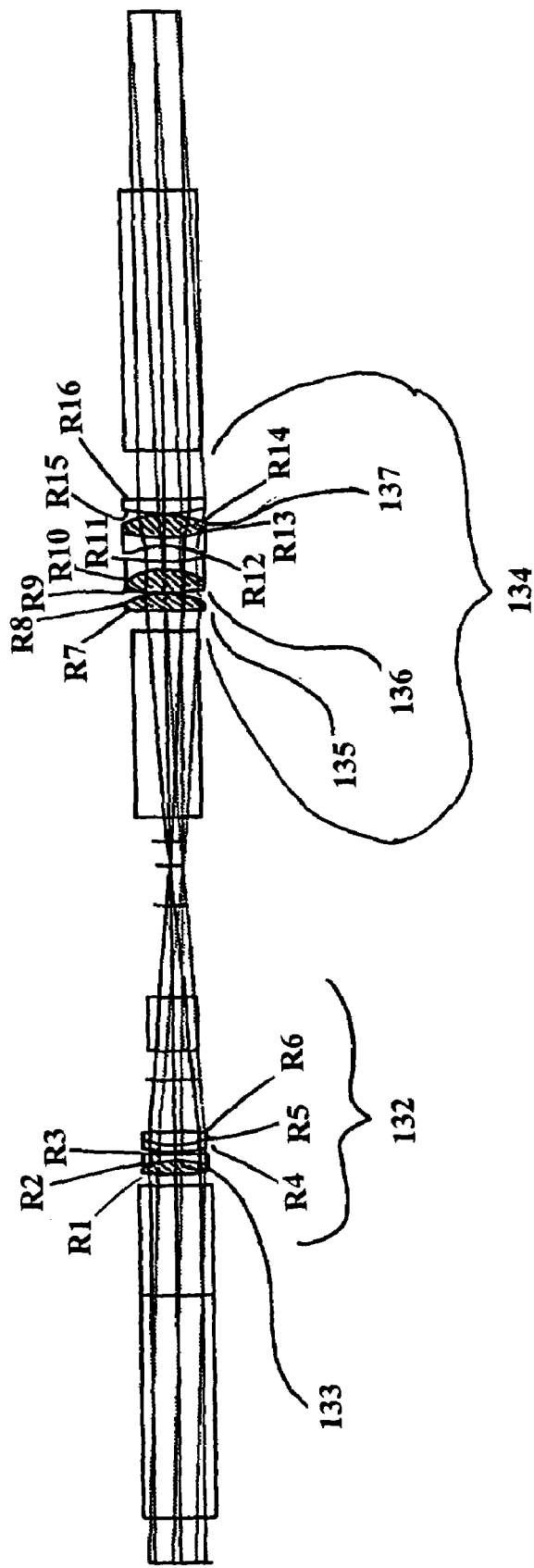
FIG. 12 shows the components of the relay optical system of the second observation device according to Embodiment 2.

FIG. 12 shows the relay optical system components housed by the intermediate optical tube of the second observation device. The relay optical system is formed of a front lens group 132 and a rear lens group 134. The front lens group includes a front lens component and a rear lens component. The rear lens group is formed of various lens elements, as shown. The lens elements shown with cross-hatching, namely, lens element 133 in the front lens group and the lens elements 135, 136 and 137 of the rear lens group are formed of anomalous dispersion glass. Use of anomalous dispersion glass in these lens elements minimizes the deterioration of the optical performance of the relay optical system within the intermediate optical tube of the second observation device.

Table 2 below lists the surface number #, the radius of curvature R of each surface, the on-axis spacing D between surfaces, as well as the index of refraction $N_d$ and the Abbe number $v_d$ (both at the d-line) of the components of relay optical systems housed by the intermediate optical tube.

TABLE 2

| # | R | D | $N_d$ | $v_d$ |
|---|---|---|---|---|
| Prism Incident Plane | ∞ | 49.155 | 1.51633 | 64.1 |
| Entrance Pupil Position | | 24.715 | 1.51633 | 64.1 |
| Prism Exit Plane | ∞ | 2.5 | | |
| 1 | 71.354 | 3 | 1.496999 | 81.6 |
| 2 | −21.547 | 1.5 | 1.729157 | 54.7 |
| 3 | ∞ | 0.5 | | |
| 4 | 34.904 | 1.5 | 1.6727 | 32.1 |
| 5 | 20.807 | 3 | 1.517417 | 52.4 |
| 6 | −54.117 | 11.5 | | |
| Mirror Reflecting Plane | ∞ | 6.5 | | |
| Prism Incident Plane | ∞ | 12 | 1.568832 | 56.3 |
| Prism Exit Plane | ∞ | 21 | | |
| Mirror Reflecting Plane | ∞ | 9 | | |
| Image Formation Position | | 5.5 | | |
| Mirror Reflecting Plane | ∞ | 5.5 | | |
| Prism Incident Plane | ∞ | 41.778 | 1.568832 | 56.3 |
| Prism Exit Plane | ∞ | 4.5 | | |
| 7 | ∞ | 3.8 | 1.496999 | 81.6 |
| 8 | −17.851 | 0.2 | | |
| 9 | 71.003 | 5.2 | 1.496999 | 81.6 |
| 10 | −14.304 | 1.8 | 1.69797 | 55.5 |
| 11 | 54.702 | 3.5 | | |
| 12 | −16.446 | 1.9 | 1.69797 | 55.5 |
| 13 | 34.763 | 5.2 | 1.496999 | 81.6 |
| 14 | −19.375 | 0.2 | | |
| 15 | 35.074 | 3.2 | 1.785896 | 44.2 |
| 16 | ∞ | 11 | | |
| Prism Incident Plane | ∞ | 57.696 | 1.785896 | 44.2 |
| Prism Exit Plane | ∞ | 39.17 | | |
| Exit Pupil Position | | | | |

EMBODIMENT 3

Figure 13:
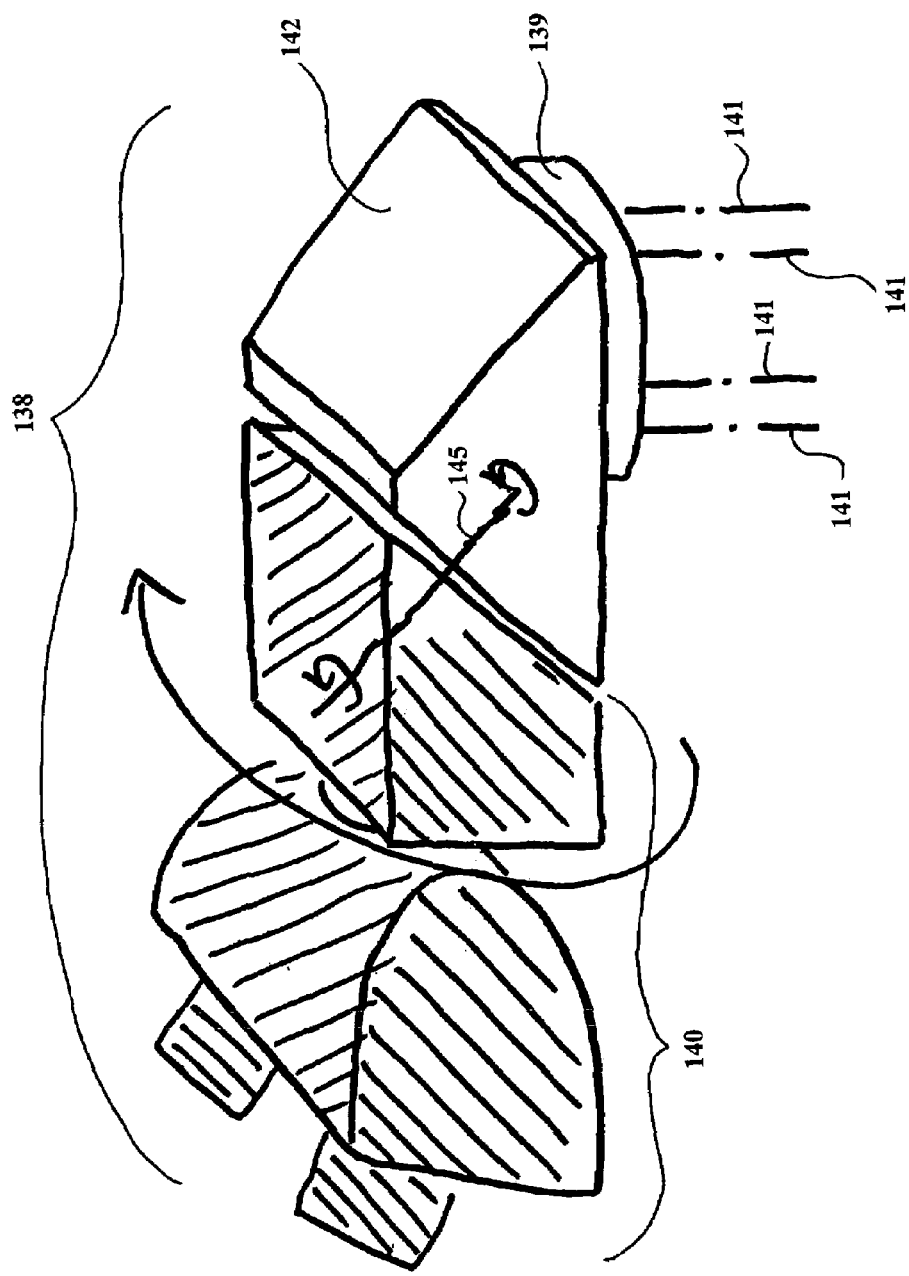
FIG. 13 shows the second observation device according to Embodiment 3.

A description of the stereoscopic microscope of Embodiment 3 will be given using FIGS. 13 and 14. FIG. 13 shows the exterior of the second observation device. A second observation device 138 has a single rotation component 140 that rotates about a rotation axis 145 that makes an angle of 50° with the optical axis of the objective optical system in the region between the object and the microscope body. At any one time, two of the four light fluxes 141 that exit the second connector 139 enter into the second observation device 138, pass through the optical system housed in the fixed component 142, and arrive at the rotation component 140.

FIG. 14 shows the arrangement of components of the optical system of the second observation device according to this embodiment. The fixed component 142 houses a prism 162 which passes all of the four light fluxes from the second connector to the rotation component 140. The rotation component 140 houses prism 143 that reflects each light flux so as to redirect the light fluxes. The rotational component 140 also houses a pair of relay optical systems (each formed of two separated lenses 161), an erection optical system 163, and an image rotator 144.

Figure 15:
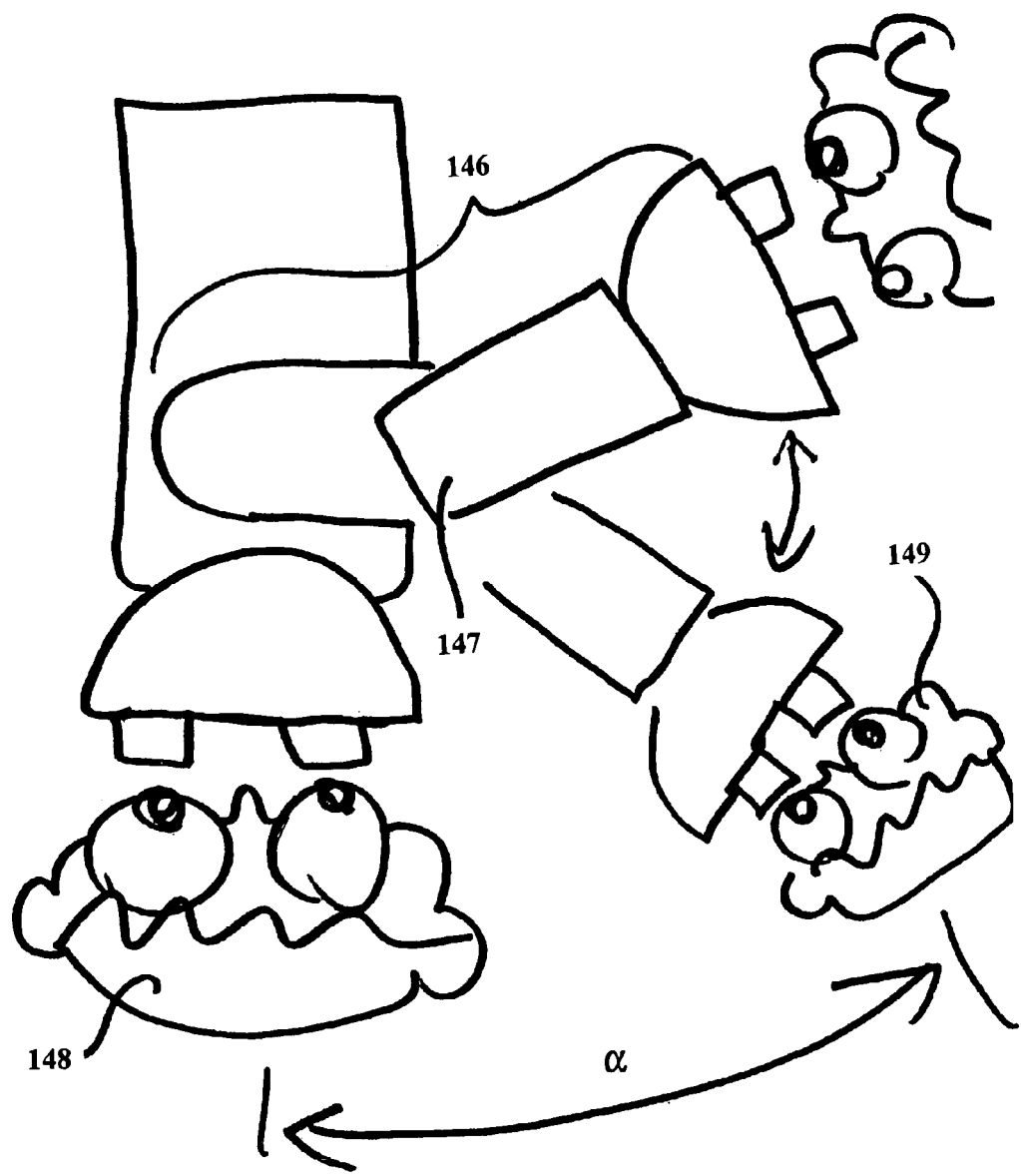
FIG. 15 shows the second observation device of Embodiment 3 at two possible rotational positions relative to the body of the stereoscopic microscope.

According to this construction, as shown in FIG. 15, the angle α, as measured between the azimuthal viewing directions between the first observer 148 and the second observer 149, can be made variable by rotation of the rotation component. Thus, the present construction allows additional rotation of the rotation component 147 (which often was previously restricted to three positions) of the second observation device 146, thereby increasing the freedom of choice in selecting an observation position of the second observer. Furthermore, the second observer can always view stereoscopic microscope observation images with correct image orientation, as long as the second observation device is rotated to positions within a limited range in which the light fluxes which enter the lenses 161 are not completely eclipsed by the rotation of the rotation component about the positions where a equals ±90 or 180 degrees.

EMBODIMENT 4

Figure 16A:
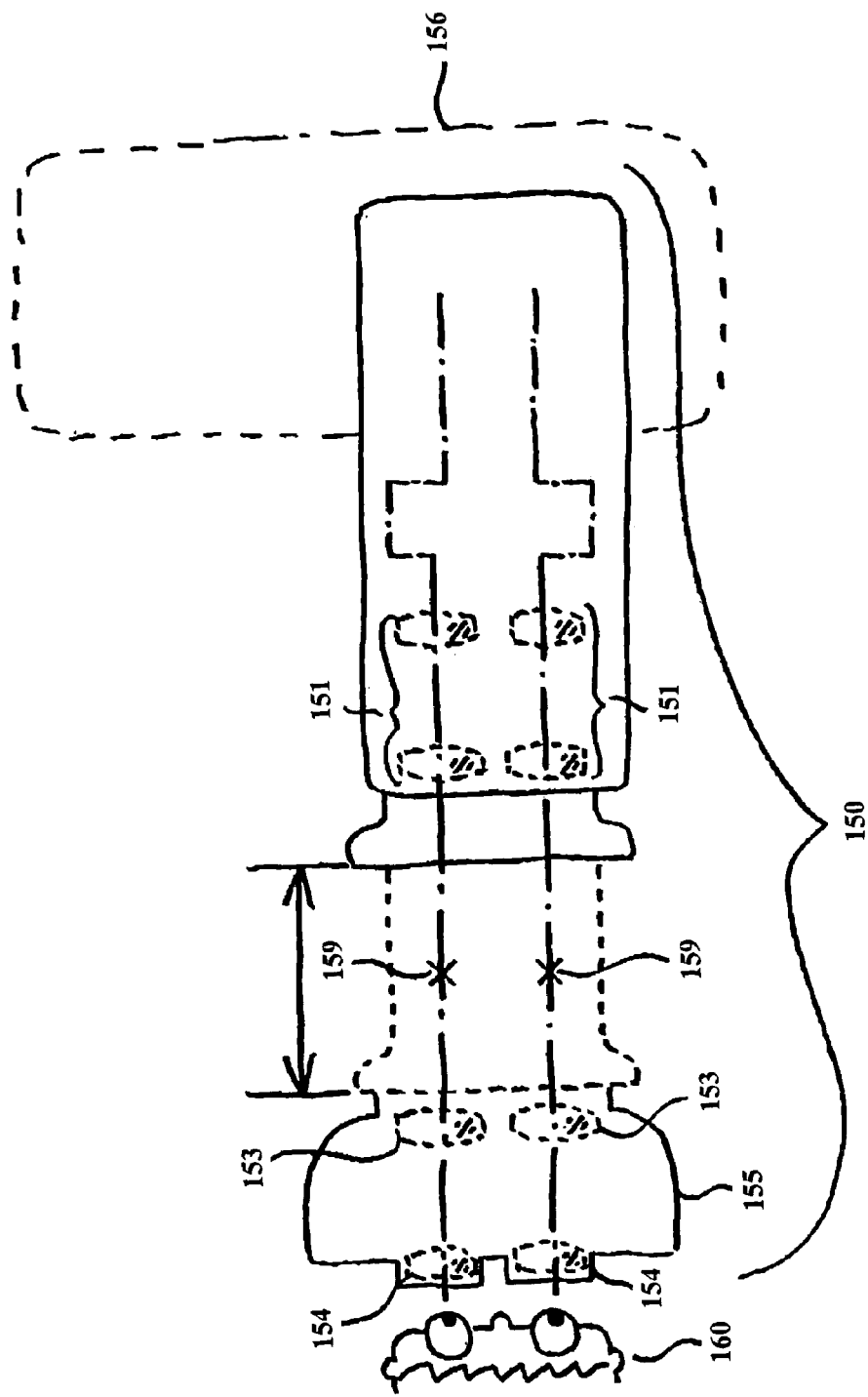
Figure 17A:
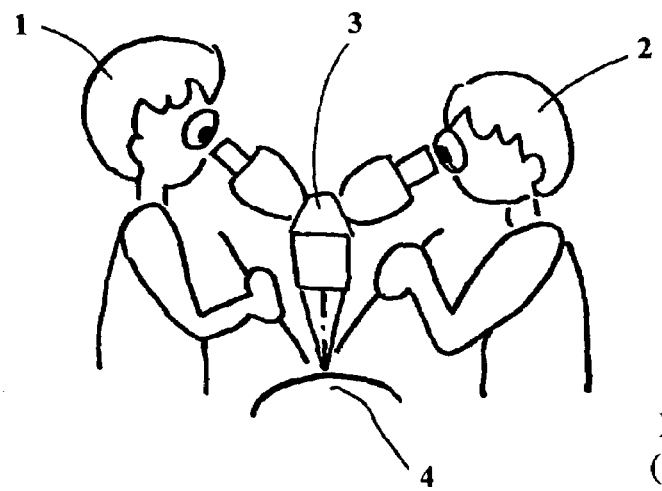
FIGS. 17(a) and 17(b) illustrate different states of use of a surgical microscope of the prior art.
Figure 17B:
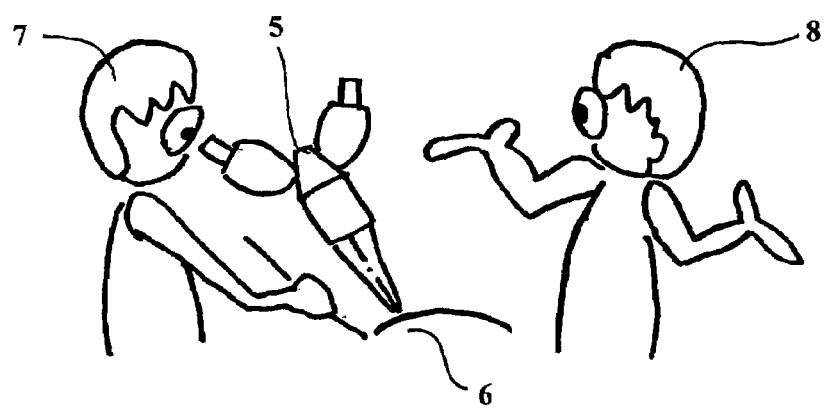
Figure 18:
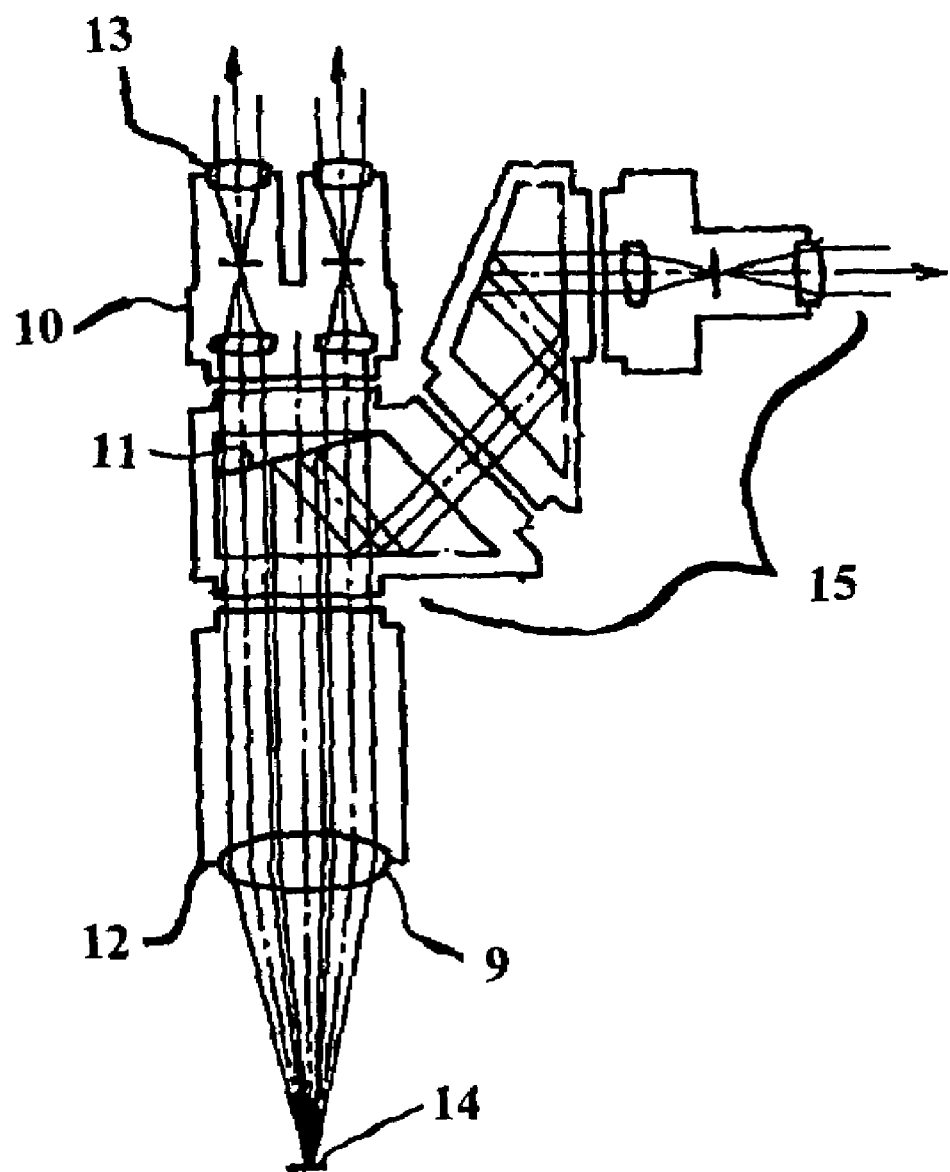
FIG. 18 is a cross-sectional view of another surgical microscope of the prior art.
Figure 19:
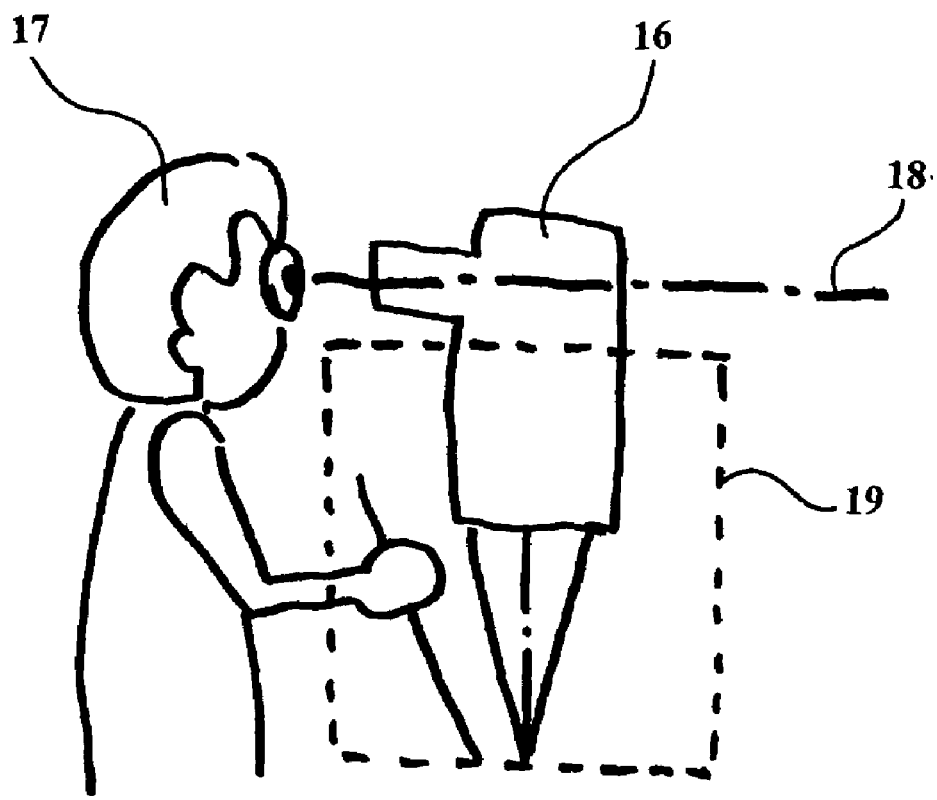
FIG. 19 illustrates the working space in another surgical microscope of the prior art.
Figure 20:
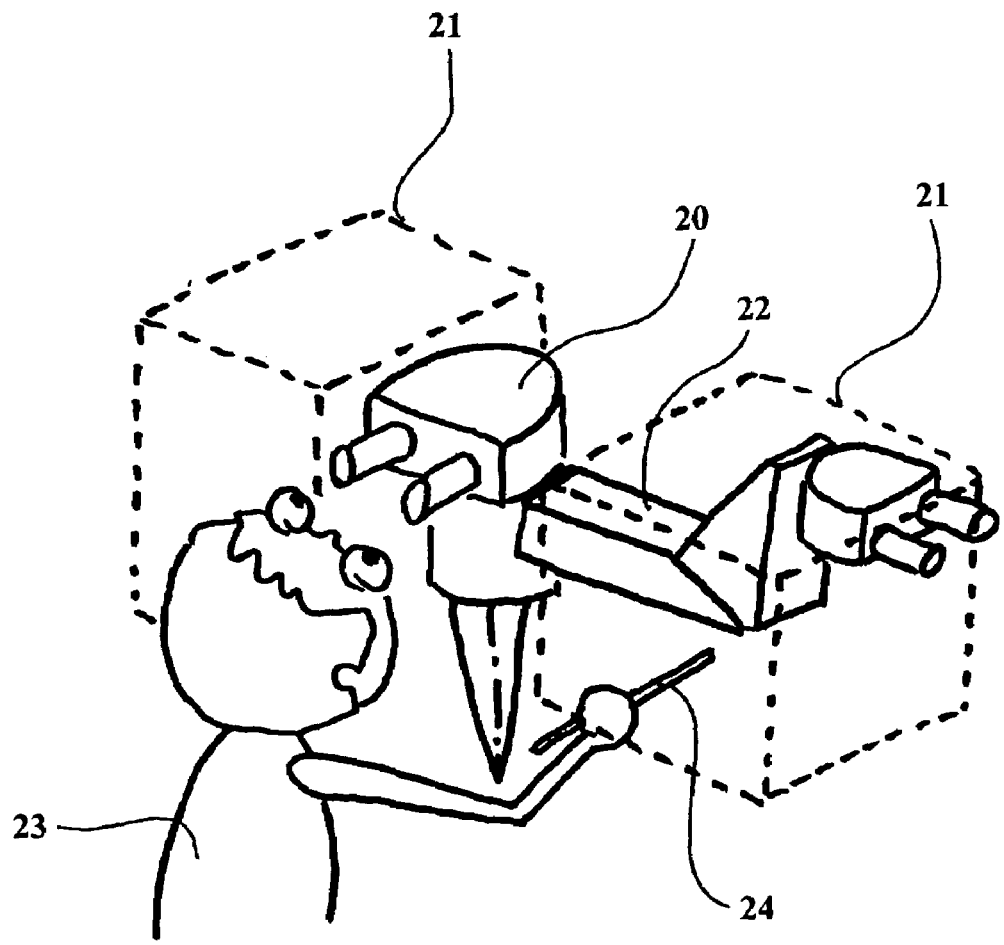
FIG. 20 illustrates the working space in another surgical microscope of the prior art.

FIGS. 16(a) and 16(b) show the second observation device 150 according to Embodiment 4 of the present invention, with FIG. 16(a) being a top view, and FIG. 16(b) being a side view. The second observation device 150 is composed of an intermediate optical tube 152 for housing a pair of relay optical systems 151, 151 (each formed of separated lens components), and an eyepiece optical tube 155 for housing a pair of image formation optical systems 153, 153 and a pair of eyepiece optical systems 154, 154. In addition, the intermediate optical tube 152 connects to the second connector 157 of the stereoscopic microscope 156 at one end, and it connects to the eyepiece optical tube 155 at the other end. The eyepiece optical tube 155 has the ability to extend and contract in the direction of the exit optical axes 158, 158 of the pair of relay optical systems 151, 151 housed by the intermediate optical tube 152. Also, both exit pupil positions 159, 159 of the pair of relay optical systems housed by the intermediate optical tube 152 are arranged in the middle position within the extending and contracting movement range.

According to this construction, the second observer 160 can move the position of the eyepiece optical tube 155 within the movement range along the optical axis of the pair of relay optical systems housed by the intermediate optical tube 152, thereby making it possible for microscope observations to be performed with more freedom of position. In addition, since the exit pupil positions 159, 159 of the pair of relay optical systems are arranged near to the middle position of the movement range, the pair of image formation optical systems housed by the eyepiece optical tube receive the light fluxes, which exit the pair of relay optical systems housed by the intermediate optical tube, in a state of substantially no eclipsing. Therefore, the second observer can observe a microscope image with substantially no eclipsing by moving the eyepiece optical tube to any of the many and various positions available.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A stereoscopic microscope that enables a plurality of observers, including a first observer and a second observer to simultaneously observe substantially the same microscope image of an object, the stereoscopic microscope comprising:
    a first observation device for use by the first observer;
    a second observation device for use by the second observer;
    a stereoscopic microscope body that includes an objective optical system, a pair of zoom optical systems, a first reflective surface that deflects light paths from the objective optical system to a substantially horizontal direction, a second reflective surface that then deflects the light paths upward, and a third reflective surface that then deflects the light paths to a substantially horizontal direction, wherein the first through third reflective surfaces form a folded optical system and the pair of zoom optical systems is arranged within the folded optical system;
    a first connector that is positioned on the stereoscopic microscope body in the vicinity that the optical axis of the objective optical system intersects with the stereoscopic microscope body, said first connector for attaching the first observation device;
    a second connector that is installed on the stereoscopic microscope body at a position that is the same level as, or above, the position that the first connector is installed on the stereoscopic microscopic body; and
    a pupil splitter unit for splitting a light flux into two light fluxes is provided near a location conjugate with the exit pupil of one of the pair of zoom optical systems; wherein
    the first connector is located at a position on the stereoscopic microscope body, in relation to the optical axis of the objective optical system, that is closer to the objective optical system than is the position of the second connector, and the first and second connectors are arranged on opposite sides of the optical axis of the objective optical system as viewed in the direction of the horizontal optical path of the folded optical system.

2. The stereoscopic microscope according to claim 1, wherein the second observation device is attached to the stereoscopic microscope body at the second connector and has a rotation axis around which the second observation device can be rotated, and
    the angle between said rotation axis and the optical axis of the objective optical system, in the region from the observed object to the microscope body, is 15 degrees or less.

3. The stereoscopic microscope according to claim 2, wherein:
    the folded optical system further comprises a first leading optical system for dividing the two light fluxes that transmit through the pair of zoom optical systems into four light fluxes, said first leading optical system leading these four light fluxes toward the second connector;
    the second observation device has an ocular optical system that includes two eyepiece lenses;
    of said four light fluxes, two light fluxes are led by the ocular optical system to said eyepiece lenses; and
    by rotating the second observation device around the rotation axis, the two light fluxes that enter the ocular optical system may be switched to the other two of said four light fluxes.

4. A stereoscopic microscope that enables a plurality of observers, including a first observer and a second observer to simultaneously observe substantially the same microscope image of an object, the stereoscopic microscope comprising:
    a first observation device for use by the first observer;
    a second observation device for use by the second observer;
    a stereoscopic microscope body that includes an objective optical system and a pair of zoom optical systems;
    a first connector that is positioned on the stereoscopic microscope body in the vicinity that the optical axis of the objective optical system intersects with the stereoscopic microscope body, said first connector for attaching the first observation device; and
    a second connector that is installed on the stereoscopic microscope body at a position that is the same level as, or above, the position that the first connector is installed on the stereoscopic microscopic body; wherein
    the first connector is located at a position on the stereoscopic microscope body, in relation to the optical axis of the objective optical system, that is closer to the objective optical system than is the position of the second connector;
    the second observation device is attached to the stereoscopic microscope body at the second connector and has a rotation axis around which the second observation device can be rotated;
    the angle between said rotation axis and the optical axis of the objective optical system, in the region from the observed object to the microscope body, is 15 degrees or less;
    the stereoscopic microscope body further comprising a first leading optical system for dividing the two light fluxes that transmit through the pair of zoom optical systems into four light fluxes, said first leading optical system leading these four light fluxes toward the second connector;
    the second observation device has an ocular optical system that includes two eyepiece lenses;
    of said four light fluxes, two light fluxes are led by the ocular optical system to said eyepiece lenses;
    by rotating the second observation device around the rotation axis, the two light fluxes that enter the ocular optical system may be switched to the other two of said four light fluxes; and
    a pupil splitter unit for splitting a light flux into two light fluxes is provided near a location conjugate with the exit pupil of one of the pair of zoom optical systems.

5. The stereoscopic microscope according to claim 1, wherein:
    the first connector has a contact surface that contacts the first observation device for attaching the first observation device to the microscope body, said contact surface having its surface normal inclined toward the first observer; and
    the second connector is positioned on the microscope body surface in a horizontal position from the first connector in a direction away from the first observer.

6. The stereoscopic microscope according to claim 2, wherein:
- the folded optical system further comprises a second leading optical system that includes a plurality of reflecting surfaces and which makes four light fluxes from the light flux that transmits through the objective optical system, the second leading optical system leading these four light fluxes toward the second connector;
- the second observation device has an ocular optical system that includes two eyepiece lenses;
- of the four light fluxes, two light fluxes are led by the ocular optical system to the eyepiece lenses; and
- by rotating the second observation device around the rotation axis, the two light fluxes that enter the ocular optical system may be switched to the other two of the four light fluxes; wherein
- each of the four light fluxes is reflected an even number of times by the plurality of reflecting surfaces.

7. The stereoscopic microscope according to claim 2, wherein:
- the folded optical system further comprises a first leading optical system for dividing the two light fluxes that transmit through the pair of zoom optical systems into four light fluxes, the first leading optical system leading these four light fluxes toward the second connector;
- the second observation device includes a rotatable part having a rotation axis, the angle between the rotation axis and the optical axis of the objective optical system in a region between the observed object and the microscope body is in a range of 35 degrees up to and including 55 degrees;
- the second observation device further comprises an ocular optical system that includes two eyepiece lenses and a third leading optical system which leads the four light fluxes just before the rotatable part; and
- the second observation device is so constructed that two of the four light fluxes enter within the rotatable part and the light fluxes that enter within the rotatable part are selected by rotation of the rotatable part around the rotation axis.

8. A stereoscopic microscope according to claim 7, wherein:
- the third leading optical system includes a plurality of reflecting surfaces, and each of the four light fluxes is reflected an even number of times by the plurality of reflecting surfaces.

9. The stereoscopic microscope according to claim 3, wherein:
- the ocular optical system includes a pair of relay optical systems, a single image rotator, a pair of image formation optical systems, and a pair of eyepiece optical systems which include said eyepiece lenses;
- the second observation device includes an intermediate tube which houses the pair of relay optical systems and the single image rotator, and an ocular tube that houses the pair of image formation optical systems and the pair of eyepiece optical systems;
- the intermediate tube is connected to the second connector at one end and is rotatably connected to the ocular tube at the other end;
- two light fluxes that pass through the pair of relay optical systems housed by the intermediate tube transmit through the image rotator; and
- the image rotator is made to rotate by one-half the amount of rotation of the ocular tube.

10. A stereoscopic microscope that enables a plurality of observers, including a first observer and a second observer to simultaneously observe substantially the same microscope image of an object, the stereoscopic microscope comprising:
- a first observation device for use by the first observer;
- a second observation device for use by the second observer;
- a stereoscopic microscope body that includes an objective optical system and a pair of zoom optical systems;
- a first connector that is positioned on the stereoscopic microscope body in the vicinity that the optical axis of the objective optical system intersects with the stereoscopic microscope body, said first connector for attaching the first observation device; and
- a second connector that is installed on the stereoscopic microscope body at a position that is the same level as, or above, the position that the first connector is installed on the stereoscopic microscopic body; wherein
- the first connector is located at a position on the stereoscopic microscope body, in relation to the optical axis of the objective optical system, that is closer to the objective optical system than is the position of the second connector;
- the second observation device is attached to the stereoscopic microscope body at the second connector and has a rotation axis around which the second observation device can be rotated;
- the angle between said rotation axis and the optical axis of the objective optical system, in the region from the observed object to the microscope body, is 15 degrees or less;
- the stereoscopic microscope body further comprising a first leading optical system for dividing the two light fluxes that transmit through the pair of zoom optical systems into four light fluxes, said first leading optical system leading these four light fluxes toward the second connector;
- the second observation device has an ocular optical system that includes two eyepiece lenses;
- of said four light fluxes, two light fluxes are led by the ocular optical system to said eyepiece lenses;
- by rotating the second observation device around the rotation axis, the two light fluxes that enter the ocular optical system may be switched to the other two of said four light fluxes;
- the ocular optical system includes a pair of relay optical systems, a single image rotator, a pair of image formation optical systems, and a pair of eyepiece optical systems including said eyepiece lenses;
- the second observation device includes an intermediate tube which houses the pair of relay optical systems having exit optical axes that are substantially parallel and the single image rotator, and an ocular tube which houses the pair of image formation optical systems and the pair of eyepiece optical systems, with the intermediate tube being connected to the second connector at one end;
- the ocular tube is extendable from, and collapsible into, the intermediate tube over a range of movement in a direction of the exit optical axes of the pair of relay optical systems; and
- exit pupils of the pair of relay optical systems are arranged near a middle position of the range of extending and collapsing movement of the ocular tube.

11. An observation device that is used by attaching it to the body of a stereoscopic microscope, said observation device comprising:

an intermediate tube that houses a pair of relay optical systems, each relay optical system having an exit axis that is substantially parallel to the exit axis of the other relay optical system, and an image rotator; and an ocular tube that houses a pair of image formation optical systems and a pair of eyepiece optical systems; wherein the intermediate optical tube has a connecting portion that may be connected to the microscope body at one end;

the ocular tube is extendable from, and collapsible into, the intermediate tube over a range of movement in the direction of the exit optical axes of the pair of relay optical systems; and exit pupils of the pair of relay optical systems are arranged near a middle position of said range of movement of the ocular tube.

* * * * *